US008916640B2

(12) United States Patent
VanSumeren et al.

(10) Patent No.: US 8,916,640 B2
(45) Date of Patent: Dec. 23, 2014

(54) BLENDED POLYOLEFIN DISPERSIONS

(75) Inventors: Mark W. VanSumeren, Midland, MI (US); Ronald Wevers, Terneuzen (NL); Charles F. Diehl, Lake Jackson, TX (US); Gary M. Strandburg, Mt Pleasant, MI (US); Brad M. Moncla, Lake Jackson, TX (US); Kevin D. Maak, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1262 days.

(21) Appl. No.: 11/897,022

(22) Filed: Aug. 28, 2007

(65) Prior Publication Data

US 2008/0176968 A1 Jul. 24, 2008

Related U.S. Application Data

(63) Continuation-in-part of application No. 11/824,765, filed on Jul. 2, 2007.

(60) Provisional application No. 60/818,911, filed on Jul. 6, 2006.

(51) Int. Cl.
*C08J 3/02* (2006.01)
*C08J 9/28* (2006.01)
*C08J 9/00* (2006.01)
*C08J 9/12* (2006.01)
*C09D 123/08* (2006.01)
*C08L 23/08* (2006.01)

(52) U.S. Cl.
CPC .... *C08J 9/28* (2013.01); *C08J 3/02* (2013.01); *C08J 9/0061* (2013.01); *C08J 9/122* (2013.01); *C09D 123/0815* (2013.01); *C08J 2323/08* (2013.01); *C08J 2423/00* (2013.01); *C08L 23/0869* (2013.01)
USPC ............. 524/501; 521/70; 523/220; 523/221; 524/505; 524/522; 524/523

(58) Field of Classification Search
USPC .......... 523/220, 221; 524/501, 522, 523, 505; 521/70
See application file for complete search history.

(56) References Cited

U.S. PATENT DOCUMENTS

| | | |
|---|---|---|
| 3,585,104 A | 6/1971 | Kleinert |
| 3,590,000 A | 6/1971 | Palermiti et al. |
| 3,645,992 A | 2/1972 | Elston |
| 3,758,643 A | 9/1973 | Fischer |
| 3,806,558 A | 4/1974 | Fischer |
| 4,076,698 A | 2/1978 | Anderson et al. |
| 4,104,210 A | 8/1978 | Coran et al. |
| 4,130,535 A | 12/1978 | Coran et al. |
| 4,202,801 A | 5/1980 | Petersen |
| 4,247,438 A * | 1/1981 | Eck et al. ...................... 523/221 |
| 4,250,273 A | 2/1981 | Bohm et al. |
| 4,271,049 A | 6/1981 | Coran et al. |
| 4,311,628 A | 1/1982 | Abdou-Sabet et al. |
| 4,340,684 A | 7/1982 | Bohm et al. |
| 4,594,130 A | 6/1986 | Chang et al. |
| 4,599,392 A | 7/1986 | McKinney et al. |
| 4,762,890 A | 8/1988 | Strait et al. |
| 4,793,898 A | 12/1988 | Laamanen et al. |
| 4,927,882 A | 5/1990 | Bayan |
| 4,927,888 A | 5/1990 | Strait et al. |
| 4,950,541 A | 8/1990 | Tabor et al. |
| 4,988,781 A | 1/1991 | McKinney et al. |
| 5,051,478 A | 9/1991 | Puydak et al. |
| 5,248,729 A | 9/1993 | Inoue et al. |
| 5,272,236 A | 12/1993 | Lai et al. |
| 5,278,272 A | 1/1994 | Lai et al. |
| 5,504,172 A | 4/1996 | Imuta et al. |
| 5,539,021 A | 7/1996 | Pate et al. |
| 5,595,628 A | 1/1997 | Gordon et al. |
| 5,677,383 A | 10/1997 | Chum et al. |
| 5,756,659 A | 5/1998 | Hughes et al. |
| 5,844,045 A | 12/1998 | Kolthammer et al. |
| 5,869,575 A | 2/1999 | Kolthammer et al. |
| 5,938,437 A | 8/1999 | DeVincenzo |
| 6,051,681 A | 4/2000 | Dozeman et al. |
| 6,111,023 A | 8/2000 | Chum et al. |
| 6,316,549 B1 | 11/2001 | Chum et al. |
| 6,423,183 B1 | 7/2002 | Goulet et al. |
| 6,448,341 B1 | 9/2002 | Kolthammer et al. |

(Continued)

FOREIGN PATENT DOCUMENTS

| | | |
|---|---|---|
| EP | 1500680 A1 | 1/2005 |
| JP | 8143804 | 6/1996 |

(Continued)

OTHER PUBLICATIONS

Written Opinion issued in related Singaporean Applicaion No. 200900004-3 dated Jan. 13, 2010. (7 pages).

(Continued)

*Primary Examiner* — Peter D Mulcahy
(74) *Attorney, Agent, or Firm* — Whyte Hirschboeck Dudek S.C.

(57) ABSTRACT

Blended polyolefin dispersions, including: (A) a liquid; (B) an olefin-based polymer dispersed in the liquid, the dispersed olefin-based polymer having an average particle size ranging from 0.1 to 5 microns; and (C) an alpha-beta unsaturated carboxylic acid-based polymer dispersed in the liquid, the dispersed alpha-beta unsaturated carboxylic acid-based polymer having an average particle size ranging from 0.02 microns to 1 micron. Coatings, froths, foams, toners, and other various uses for the blended dispersions are also disclosed.

14 Claims, No Drawings

(56) References Cited

U.S. PATENT DOCUMENTS

| | | |
|---|---|---|
| 6,455,636 B2 | 9/2002 | Sanada et al. |
| 6,538,070 B1 | 3/2003 | Cardwell et al. |
| 6,566,446 B1 | 5/2003 | Parikh et al. |
| 6,824,650 B2 | 11/2004 | Lindsay et al. |
| 6,837,970 B2 | 1/2005 | Ko et al. |
| 6,863,940 B2 | 3/2005 | Silver et al. |
| 7,439,276 B2 | 10/2008 | Strandburg et al. |
| 7,935,755 B2 | 5/2011 | Moncla et al. |
| 2002/0155281 A1* | 10/2002 | Lang et al. ............ 428/337 |
| 2004/0127614 A1* | 7/2004 | Jiang et al. ............ 524/270 |
| 2004/0149412 A1 | 8/2004 | Tammi et al. |
| 2005/0021622 A1 | 1/2005 | Cullen |
| 2005/0100754 A1 | 5/2005 | Moncla et al. |
| 2005/0192365 A1 | 9/2005 | Strandburg et al. |
| 2005/0192402 A1 | 9/2005 | Antal et al. |
| 2005/0271888 A1 | 12/2005 | Moncla et al. |
| 2006/0019906 A1 | 1/2006 | Satoh et al. |
| 2006/0198983 A1 | 9/2006 | Patel |
| 2006/0199006 A1 | 9/2006 | Poon et al. |
| 2006/0199744 A1 | 9/2006 | Walton et al. |
| 2006/0199872 A1 | 9/2006 | Prieto et al. |
| 2006/0199884 A1 | 9/2006 | Hoenig et al. |
| 2006/0199887 A1 | 9/2006 | Liang et al. |
| 2006/0199896 A1 | 9/2006 | Walton et al. |
| 2006/0199897 A1 | 9/2006 | Karjala et al. |
| 2006/0199905 A1 | 9/2006 | Hughes et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Li Pi Shan et al. |
| 2006/0199931 A1 | 9/2006 | Poon et al. |
| 2006/0205883 A1 | 9/2006 | Loyen et al. |
| 2006/0211819 A1 | 9/2006 | Hoenig et al. |
| 2007/0010616 A1 | 1/2007 | Kapur et al. |
| 2007/0078222 A1 | 4/2007 | Chang et al. |
| 2007/0092704 A1 | 4/2007 | Patel et al. |
| 2007/0141933 A1 | 6/2007 | Wevers et al. |
| 2007/0160833 A1 | 7/2007 | Maak et al. |
| 2008/0200891 A1 | 8/2008 | Kim et al. |

FOREIGN PATENT DOCUMENTS

| | | |
|---|---|---|
| JP | 2004155851 | 6/2004 |
| JP | 2005140835 | 6/2005 |
| JP | 2005154562 | 6/2005 |
| JP | 2006152222 | 6/2006 |
| WO | WO-0001745 | 1/2000 |
| WO | WO-2005021622 | 3/2005 |
| WO | WO-2005021638 | 3/2005 |
| WO | 2007/008558 A2 | 1/2007 |
| WO | 2007/011728 A2 | 1/2007 |

OTHER PUBLICATIONS

Official Action issued Mar. 18, 2010 by the Patent Office of the Russian Federation in corresponding Russian Patent Application No. 2009103922.

Translation of Substantive Technical Examination report issued in corresponding Argentine patent application No. P07013004 (5 pages).

Second Written Opinion issued in related Singaporean Application No. 200900004-3 dated Jul. 15, 2010. (8 pages).

Non-final Office Action issued Dec. 20, 2010 in related U.S. Appl. No. 11/824,765 (27 pages).

Examiner's Report issued Dec. 22, 2010 in corresponding Canadian application No. 2,656,925 (2 pages).

First Office Action issued by the Chinese Patent Office in corresponding application No. 200780031496.7 (4 pages).

Notice of Preliminary Rejection issued Feb. 14, 2011 by the Korean Patent Office in corresponding application No. 10-2009-7002344 (7 pages).

Examination Report dated Jun. 14, 2011 issued by the Intellectual Property Office of Singapore in corresponding Singapore application No. 200900004-3 (5 pages).

Final Office Action issued Jul. 13, 2011 in related U.S. Appl. No. 11/824,765 (6 pages).

Final Office Action dated Mar. 1, 2012 issued in related U.S. Appl. No. 11/824,765 (7 pages).

Translation of Notice of Reasons for Rejection dated Jan. 10, 2012 in corresponding Japanese application No. 2009-518369 (5 pages).

Extended European Search Report for related Application No. 07810210 dated Jul. 16, 2009. (6 pages).

English Patent Abstract of JP2006152222 from esp@cenet, published Jun. 15, 2006, 1 page.

English Patent Abstract of JP2005154562 from esp@cenet, published Jun. 16, 2005, 1 page.

English Patent Abstract of JP2004155851 from esp@cenet, published Jun. 3, 2004, 1 page.

English Patent Abstract of JP2005140835 from esp@cenet, published Jun. 2, 2005, 1 page.

English Patent Abstract of JP8143804 from esp@cenet, published Jun. 4, 1996, 1 page.

PCT International Preliminary Report of Patentabillity and Written Opinion of the ISR issued in PCT Application No. PCT/US2007/015493 dated Jan. 6, 2009, (6 pages).

* cited by examiner

BLENDED POLYOLEFIN DISPERSIONS

CROSS-REFERENCE TO RELATED APPLICATION

This application is a continuation-in-part of U.S. patent application Ser. No. 11/824,765, filed on Jul. 2, 2007, which claims benefit to U.S. Provisional Application Ser. No. 60/818,911, filed on Jul. 6, 2006, each of which are hereby incorporated by reference.

BACKGROUND OF DISCLOSURE

1. Field of the Disclosure

Embodiments disclosed herein relate generally to dispersions including olefin-based polymers and alpha-beta unsaturated carboxylic acid-based polymers. More specifically, embodiments disclosed herein relate to dispersions formed by blending one or more dispersions of olefin-based polymers with one or more dispersions of alpha-beta unsaturated carboxylic acid-based polymers, and froths, films, foams, and coatings made therefrom.

2. Background

Aqueous dispersions of a thermoplastic resin of various types are known in the art and have been used in a wide variety of fields. For example, when an aqueous dispersion is coated and dried on a surface of a substrate such as paper, fiber, wood, metal, or plastic molded article, the resin coating formed will provide the substrate with water resistance, oil resistance, chemical resistance, corrosion resistance and heat sealability. An aqueous medium is advantageous compared to an organic dispersion medium in view of common hazards such as flammability, working environment, handling convenience, and the like.

Conventional aqueous dispersions of a thermoplastic resin have been produced either by a process wherein a polymerizable monomer which is the resin raw material is polymerized by emulsion polymerization in an aqueous medium in the presence of a dispersing agent, or by a process wherein a molten thermoplastic resin and an aqueous medium, and optionally, a dispersing agent are mixed by applying shearing force. The former process is associated with the disadvantage of the limited number of the polymerizable monomers that can be used, and hence, the variety of the aqueous dispersions of the thermoplastic resin that can be produced, is limited. The former process also suffers from complicated control of the polymerization reaction as well as intricate equipment. On the other hand, the latter process is applicable to a wide variety of resins in relatively simple equipment.

Coatings and articles produced via aqueous dispersions of typical ethylene copolymers lack the heat resistance and compression set properties needed for many applications. For example, frothed foams made via the frothing and drying of aqueous dispersions of homogeneous ethylene-octene copolymers exhibit the softness required for hygiene and fabric backing applications, but lack the heat resistance required for shipment during the summer months. In addition, coatings and foams to be used in the interior of an automobile typically require heat resistance to at least 60° C. In this environment, frothed foams based on homogeneous, low crystallinity ethylene copolymers will not retain mechanical properties such as compression set.

Accordingly, there exists a need for dispersions and foams formed from ethylene and propylene based interpolymers having improved properties.

SUMMARY OF DISCLOSURE

In one aspect, embodiments disclosed herein relate to blended polyolefin dispersions, including: (A) a liquid; (B) an olefin-based polymer dispersed in the liquid, the dispersed olefin-based polymer having an average particle size ranging from 0.1 to 5 microns; and (C) an alpha-beta unsaturated carboxylic acid-based polymer dispersed in the liquid, the dispersed alpha-beta unsaturated carboxylic acid-based polymer having an average particle size ranging from 0.02 microns to 1 micron.

In another aspect, embodiments disclosed herein relate to a method of forming a blended polyolefin dispersion, including: forming a first dispersion comprising a first liquid, a polyolefin and a dispersion stabilizing agent; forming a second dispersion comprising a second liquid, an alpha-beta unsaturated carboxylic acid-based polymer and a neutralizing agent; and admixing the first and second dispersion to form a blended polyolefin dispersion.

In another aspect, embodiments disclosed herein relate to a method of forming a foam, including: contacting a blended polyolefin dispersion, as described above, with air or other inert gas to form a whipped dispersion; depositing the whipped dispersion onto a substrate; and at least partially drying the whipped dispersion to form a frothed foam.

In another aspect, embodiments disclosed herein relate to a cellulose-based article including: a cellulose-based composition; and an applied compound, wherein the applied compound, at the time of application, comprises a blended polyolefin dispersion including: a polyolefin dispersed in the liquid, the dispersed polyolefin having an average particle size ranging from 0.1 to 5 microns; and an alpha-beta unsaturated carboxylic acid-based polymer dispersed in the liquid, the dispersed alpha-beta unsaturated carboxylic acid-based polymer having an average particle size ranging from 0.02 microns to 1 micron.

In another aspect, embodiments disclosed herein relate to an article formed by a process including: impregnating a fibrous structure with a compound, the compound comprising an aqueous dispersion, the dispersion including: a polyolefin dispersed in the liquid, the dispersed polyolefin having an average particle size ranging from 0.1 to 5 microns; and an alpha-beta unsaturated carboxylic acid-based polymer dispersed in the liquid, the dispersed alpha-beta unsaturated carboxylic acid-based polymer having an average particle size ranging from 0.02 microns to 1 micron; and removing at least a portion of the water from the impregnated fibrous structure.

In another aspect, embodiments disclosed herein relate to a toner composition including: a particulate made from a liquid based dispersion, the dispersion including: a polyolefin dispersed in the liquid, the dispersed polyolefin having an average particle size ranging from 0.1 to 5 microns; and an alpha-beta unsaturated carboxylic acid-based polymer dispersed in the liquid, the dispersed alpha-beta unsaturated carboxylic acid-based polymer having an average particle size ranging from 0.02 microns to 1 micron; and at least one selected from the group consisting of a colorant and a magnetic pigment.

In another aspect, embodiments disclosed herein relate to a method for forming a layer on a substrate including: applying a dispersion to a substrate, the dispersion including: a polyolefin dispersed in the liquid, the dispersed polyolefin having an average particle size ranging from 0.1 to 5 microns; and an alpha-beta unsaturated carboxylic acid-based polymer dispersed in the liquid, the dispersed alpha-beta unsaturated carboxylic acid-based polymer having an average particle size ranging from 0.02 microns to 1 micron; and removing at least a portion of a liquid in the dispersion to form a first layer.

In another aspect, embodiments disclosed herein relate to a method to make a long fiber concentrate comprising fibers and a thermoplastic resin including the steps of: (i) coating continuous fibers with a dispersion, wherein the dispersion includes: a polyolefin dispersed in the liquid, the dispersed polyolefin having an average particle size ranging from 0.1 to 5 microns; and an alpha-beta unsaturated carboxylic acid-based polymer dispersed in the liquid, the dispersed alpha-beta unsaturated carboxylic acid-based polymer having an average particle size ranging from 0.02 microns to 1 micron; (ii) heating the coated continuous fiber strands, (iii) chopping the dried coated continuous fiber strands forming dried long fiber concentrate pellets, and (iv) isolating dried long fiber concentrate pellets.

In another aspect, embodiments disclosed herein relate to a method to make a long fiber concentrate including fibers and a thermoplastic resin comprising the steps of: (i) coating chopped long fibers with a dispersion wherein the dispersion includes: a polyolefin dispersed in the liquid, the dispersed polyolefin having an average particle size ranging from 0.1 to 5 microns; and an alpha-beta unsaturated carboxylic acid-based polymer dispersed in the liquid, the dispersed alpha-beta unsaturated carboxylic acid-based polymer having an average particle size ranging from 0.02 microns to 1 micron; (ii) heating the coated chopped long fiber concentrate pellets, and (iii) isolating dried long fiber concentrate pellets.

Other aspects and advantages of the invention will be apparent from the following description and the appended claims.

DETAILED DESCRIPTION

Embodiments disclosed herein relate generally to dispersions including olefin-based polymers and alpha-beta unsaturated carboxylic acid-based polymers. More specifically, embodiments disclosed herein relate to dispersions formed by blending one or more dispersions of olefin-based polymers with one or more dispersions of alpha-beta unsaturated carboxylic acid-based polymers, and froths, films, foams, and coatings made therefrom. More specifically, embodiments disclosed herein relate to dispersions formed by blending one or more polyolefin dispersions with one or more ethylene-acid copolymer dispersions, and froths, films, foams, and coatings made therefrom.

Polyolefin dispersions formed in accordance with embodiments disclosed herein may include an olefin-based polymer and a stabilizing agent. The olefin-based polymer, in some embodiments, may include propylene-based polymers, ethylene-based polymers, or combinations thereof. Polyolefin dispersions may optionally include a secondary polymer, additives, and neutralizing agents.

Alpha-beta unsaturated carboxylic acid-based polymer dispersions formed in accordance with other embodiments disclosed herein may include at least one ethylene-acid copolymer and a neutralizing agent. Ethylene-acid copolymer dispersions may optionally include a secondary polymer, additives, and stabilizing agents.

Blended polyolefin dispersion in accordance with embodiments disclosed herein may be formed by blending one or more polyolefin dispersions with one or more ethylene-acid copolymer dispersions. Additives, fillers, and other optional components may also be added to the blended polyolefin dispersions described herein.

Embodiments of the blended polyolefin dispersions may be formed where the one or more polyolefin dispersions form the majority dispersion component. In other embodiments, the one or more ethylene-acid copolymer dispersions may form the majority dispersion component. Based on the above description of embodiments of the dispersions, the individual components and embodiments of the dispersions disclosed herein will be described below.

Dispersed Polyolefin

The polyolefin resin dispersed in embodiments of the aqueous polyolefin dispersion of the present disclosure is a resin that is not readily dispersible in water by itself. Resins used in embodiments disclosed herein may include elastomers and blends of olefin polymers. In select embodiments, the polyolefin resin is formed from ethylene-alpha olefin copolymers or propylene-alpha olefin copolymers. In particular, in select embodiments, the thermoplastic resin includes one or more non-polar polyolefins.

In some embodiments, the polyolefin resin is a semicrystalline resin. The term "semi-crystalline" is intended to identify those resins that possess at least one endotherm when subjected to standard differential scanning calorimetry (DSC) evaluation. Some semi-crystalline polymers exhibit a DSC endotherm that exhibits a relatively gentle slope as the scanning temperature is increased past the final endotherm maximum. This reflects a polymer of broad melting range rather than a polymer having what is generally considered to be a sharp melting point. Some polymers useful in the dispersions have a single melting point while other polymers have more than one melting point.

In some polyolefins, one or more of the melting points may be sharp such that all or a portion of the polymer melts over a fairly narrow temperature range, such as a few degrees centigrade. In other embodiments, the polyolefin may exhibit broad melting characteristics over a range of about 20° C. In yet other embodiments, the polyolefin may exhibit broad melting characteristics over a range of greater than 50° C.

The polyolefin resin may be a non-functionalized resin in some embodiments. In other embodiments, the thermoplastic resin may be a non-polar resin.

Examples of the polyolefin resin which may be used in embodiments disclosed herein include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymers, ethylene-1-butene copolymer, and propylene-1-butene copolymers; copolymers (including elastomers) of an alpha-olefin with a conjugated or non-conjugated diene, as typically represented by ethylene-butadiene copolymers and ethylene-ethylidene norbornene copolymers; and polyolefins (including elastomers) such as copolymers of two or more alpha-olefins with a conjugated or non-conjugated diene, as typically represented by ethylene-propylene-butadiene copolymers, ethylene-propylene-dicyclopentadiene copolymers, ethylene-propylene-1,5-hexadiene copolymers, and ethylene-propylene-ethylidene norbornene copolymers; ethylene-vinyl compound copolymers such as ethylene-vinyl acetate copolymers, ethylene-vinyl alcohol copolymers, and ethylene-vinyl chloride copolymers; styrenic copolymers (including elastomers) such as polystyrene, ABS, acrylonitrile-styrene copolymers, α-methylstyrene-styrene copolymers, styrene vinyl alcohols, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymers and hydrates thereof, and styrene-isoprene-styrene triblock copolymers; polyvinyl compounds such as polyvinyl chloride, polyvinylidene chloride, vinyl chloride-vinylidene chloride copolymers, polymethyl acrylate, and polymethyl methacrylate; polyamides such as nylon 6, nylon 6,6, and nylon 12; thermoplastic polyesters such as polyethylene terephthalate and polybutylene terephthalate; polycarbonates, polyphenylene oxides, and the like; and glassy hydrocarbon-based resins, including poly-dicyclopentadiene polymers and related polymers (copolymers, terpolymers); saturated mono-olefins such as vinyl acetate, vinyl propionate, vinyl butyrate, and the like; vinyl esters such as esters of monocarboxylic acids, including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These polyolefin resins may be used either alone or in combinations of two or more. Examples of specific polyolefin resins include styrene-butadiene copolymers with a styrene content of from about 70 to about 95 weight percent.

As one suitable type of resin, the esterification products of a di- or poly-carboxylic acid and a diol comprising a diphenol may be used. These resins are illustrated in U.S. Pat. No. 3,590,000, which is incorporated herein by reference. Other specific examples of resins include styrene/methacrylate copolymers, and styrene/butadiene copolymers; suspension polymerized styrene butadienes; polyester resins obtained from the reaction of bisphenol A and propylene oxide followed by the reaction of the resulting product with fumaric acid; and branched polyester resins resulting from the reaction of dimethylterephthalate, 1,3-butanediol, 1,2-propanediol, and pentaerythritol, styrene acrylates, and mixtures thereof. Further, specific embodiments employ ethylene-based polymers, propylene-based polymers, propylene-ethylene copolymers, and styrenic copolymers as one component of a composition.

In selected embodiments, one component is formed from ethylene-alpha olefin copolymers or propylene-alpha olefin copolymers. In particular, in select embodiments, the thermoplastic resin comprises one or more non-polar polyolefins.

In specific embodiments, polyolefins such as polypropylene, polyethylene, copolymers thereof, and blends thereof, as well as ethylene-propylene-diene terpolymers, may be used. In some embodiments, preferred olefinic polymers include homogeneous polymers, as described in U.S. Pat. No. 3,645,992 issued to Elston; high density polyethylene (HDPE), as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

Polymer compositions, and blends thereof, described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, may also be suitable in some embodiments. In some embodiments, the blends may include two different Ziegler-Natta polymers. In other embodiments, the blends may include blends of a Ziegler-Natta and a metallocene polymer. In still other embodiments, the polymer used herein may be a blend of two different metallocene polymers. In other embodiments, single site catalyst polymers may be used.

In some embodiments, the polyolefin is a propylene-based copolymer or interpolymer. In some particular embodiments, the propylene-based copolymer or interpolymer is characterized as having substantially isotactic propylene sequences. The term "substantially isotactic propylene sequences" and similar terms mean that the sequences have an isotactic triad (mm) measured by $^{13}C$ NMR of greater than about 0.85 in one embodiment; greater than about 0.90 in another embodiment; greater than about 0.92 in another embodiment; and greater than about 0.93 in yet another embodiment. Isotactic triads are well-known in the art and are described in, for example, U.S. Pat. No. 5,504,172 and WO 00/01745, which refer to the isotactic sequence in terms of a triad unit in the copolymer molecular chain determined by $^{13}C$ NMR spectra.

One embodiment of the propylene-based polymer is a propylene-ethylene copolymer or interpolymer, where ethylene may be present in an amount from about 5% to about 25% by weight. In some embodiments, the propylene-rich alpha-olefin interpolymer is characterized as having an isotactic triad (mm) measured by $^{13}C$ NMR of greater than about 0.85. Some such propylene-rich alpha-olefin interpolymers may have from 5 to 25% by weight of ethylene-derived units and 95 to 75% by weight of propylene-derived units. Additionally, some propylene-rich alpha-olefin interpolymers have (a) a melting point of less than 90° C.; (b) a relationship of elasticity to 500% tensile modulus such that the elasticity is less than or equal to 0.935M+12, where elasticity is in percent and M is the 500% tensile modulus in MPa; and (c) a relationship of flexural modulus to 500% tensile modulus such that flexural modulus is less than or equal to $4.2e^{0.27M}+50$, where flexural modulus is in MPa and M is the 500% tensile modulus in MPa. In some embodiments, the propylene rich alpha-olefin interpolymer comprises 6 to 20% by weight of ethylene-derived units and 94 to 80% by weight of propylene-derived units. In other embodiments, polymers may comprise 8 to 20% by weight of ethylene-derived units and 92 to 80% by weight of propylene-derived units. In still other embodiments, polymers may comprise 10 to 20% by weight of ethylene-derived units and 90 to 80% by weight of propylene-derived units.

In other particular embodiments, the polyolefin may be ethylene vinyl acetate (EVA) based polymers. In other embodiments, the polyolefin may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In one particular embodiment, the polyolefin may comprise an alpha-olefin interpolymer of ethylene with a comonomer comprising an alkene, such as 1-octene. The ethylene and octene copolymer may be present alone or in combination with another thermoplastic resin, such as ethylene-acrylic acid copolymer. When present together, the weight ratio between the ethylene and octene copolymer and the ethylene-acrylic acid copolymer may range from about 1:10 to about 10:1, such as from about 3:2 to about 2:3. The polymeric resin, such as the ethylene-octene copolymer, may have a crystallinity of less than about 50%, such as less than about 25%. In some embodiments, the crystallinity of the polymer may range from 5 to 35 percent. In other embodiments, the crystallinity may range from 7 to 20 percent.

Embodiments disclosed herein may also include a polyolefin component that may include at least one multi-block olefin interpolymer. Suitable multi-block olefin interpolymers may include those described in U.S. Provisional Patent Application No. 60/818, 911, for example. The term "multi-block copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

The multi-block copolymers are characterized by unique distributions of polydispersity index (PDI or $M_w/M_n$), block length distribution, and/or block number distribution due to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1.0 to about 2.9; from about 1.3 to about 2.5 in other embodiments; from about 1.4 to about 2.0 in other embodiments; and from about 1.4 to about 1.8 in yet other embodiments.

One example of the multi-block olefin interpolymer is an ethylene/α-olefin block interpolymer. Another example of the multi-block olefin interpolymer is a propylene/α-olefin block interpolymer. The following description focuses on the interpolymer as having ethylene as the majority monomer, but applies in a similar fashion to propylene-based multi-block interpolymers with regard to general polymer characteristics.

The ethylene/α-olefin multi-block copolymers may comprise ethylene and one or more co-polymerizable α-olefin comonomers in polymerized form, characterized by multiple (i.e., two or more) blocks or segments of two or more polymerized monomer units differing in chemical or physical properties (block interpolymer). In some embodiments, the copolymer is a multi-block interpolymer. In some embodiments, the multi-block interpolymer may be represented by the following formula:

(AB)$_n$ where n is at least 1, and in various embodiments n is an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 weight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

AAA-AA-BBB-BB

In other embodiments, the block copolymers do not have a third block. In still other embodiments, neither block A nor block B comprises two or more segments (or sub-blocks), such as a tip segment.

The multi-block interpolymers may be characterized by an average block index, ABI, ranging from greater than zero to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

ABI=Σ($w_i$BI$_i$)

where BI$_i$ is the block index for the i$^{th}$ fraction of the multi-block interpolymer obtained in preparative TREF, and $w_i$ is the weight percentage of the i$^{th}$ fraction.

Similarly, the square root of the second moment about the mean, hereinafter referred to as the second moment weight average block index, may be defined as follows:

2$^{nd}$ moment weight average $$BI = \sqrt{\frac{\sum(w_i(BI_i - ABI)^2)}{\frac{(N-1)\sum w_i}{N}}}$$

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the analytical temperature rising elution fractionation (ATREF) elution temperature for the i$^{th}$ fraction (preferably expressed in Kelvin), $P_X$ is the ethylene mole fraction for the i$^{th}$ fraction, which may be measured by NMR or IR as described below. $P_{AB}$ is the ethylene mole fraction of the whole ethylene/α-olefin interpolymer (before fractionation), which also may be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the multi-block interpolymer. $T_{AB}$ may be calculated from the mole fraction of ethylene (measured by NMR) using the following equation:

$$LnP_{AB} = \alpha/T_{AB} + \beta$$

where α and β are two constants which may be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$LnP = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition and having an ethylene mole fraction of $P_X$. $T_{XO}$ may be calculated from $LnP_X = \alpha/T_{XO} + \beta$. Conversely, $P_{XO}$ is the ethylene mole fraction for a random copolymer of the same composition and having an ATREF temperature of $T_X$, which may be calculated from $Ln P_{XO} = \alpha/T_X + \beta$.

Once the block index (BI) for each preparative TREF fraction is obtained, the weight average block index, ABI, for the whole polymer may be calculated. In some embodiments, ABI is greater than zero but less than about 0.4 or from about 0.1 to about 0.3. In other embodiments, ABI is greater than about 0.4 and up to about 1.0. In yet other embodiments, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the multi-block interpolymer is that the interpolymer may comprise at least one polymer fraction which may be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

Ethylene α-olefin multi-block interpolymers used in embodiments disclosed herein may be interpolymers of ethylene with at least one $C_3$-$C_{20}$ α-olefin. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or non-conjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. In certain embodiments, the α-olefins may be I-Butene or 1-octene. Other suitable monomers include styrene, halo- or alkyl-substituted styrenes, vinylbenzocyclobutane, 1,4-hexadiene, 1,7-octadiene, and naphthenics (such as cyclopentene, cyclohexene, and cyclooctene, for example).

The multi-block interpolymers disclosed herein may be differentiated from conventional, random copolymers, physical blends of polymers, and block copolymers prepared via sequential monomer addition, fluxional catalysts, and anionic or cationic living polymerization techniques. In particular, compared to a random copolymer of the same monomers and monomer content at equivalent crystallinity or modulus, the interpolymers have better (higher) heat resistance as measured by melting point, higher-TMA penetration temperature, higher high-temperature tensile strength, and/or higher high-temperature torsion storage modulus as determined by dynamic mechanical analysis. As compared to a random copolymer containing the same monomers and monomer content, the multi-block interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

Other olefin interpolymers include polymers comprising monovinylidene aromatic monomers including styrene, o-methyl styrene, p-methyl styrene, t-butylstyrene, and the like. In particular, interpolymers comprising ethylene and styrene may be used. In other embodiments, copolymers comprising ethylene, styrene and a $C_3$-$C_{20}$ α-olefin, optionally comprising a $C_4$-$C_{20}$ diene, may be used.

Suitable non-conjugated diene monomers may include straight chain, branched chain or cyclic hydrocarbon dienes having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD).

One class of desirable polyolefins that may be used in accordance with embodiments disclosed herein includes elastomeric interpolymers of ethylene, a $C_3$-$C_{20}$ α-olefin, especially propylene, and optionally one or more diene monomers. Preferred α-olefins for use in this embodiment are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene-based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

The olefin polymers, copolymers, interpolymers, and multi-block interpolymers may be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an olefin polymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of which are incorporated herein by reference in their entirety. One particularly useful functional group is maleic anhydride.

The amount of the functional group present in the functional polymer may vary. The functional group may be present in an amount of at least about 0.25 weight percent in some embodiments; at least about 5 weight percent in other embodiments; and at least about 7 weight percent in yet other embodiments. The functional group may be present in an amount less than about 40 weight percent in some embodiments; less than about 30 weight percent in other embodiments; and less than about 25 weight percent in yet other embodiments.

In certain embodiments, the polyolefin resin may be an ethylene-octene copolymer or interpolymer having a density between 0.857 and 0.911 g/cc and melt index (190° C. with 2.16 kg weight) from 0.1 to 100 g/10 min. In other embodiments, the ethylene-octene copolymers may have a density between 0.857 and 0.902 g/cc and melt index (190° C. with 2.16 kg weight) from 0.8 to 35 g/10 min.

In certain embodiments, the polyolefin resin may be a propylene-ethylene copolymer or interpolymer having an ethylene content between 5 and 20% by weight and a melt flow rate (230° C. with 2.16 kg weight) from 0.5 to 300 g/10 min. In other embodiments, the propylene-ethylene copolymer or interpolymer may have an ethylene content between 5 and 12% by weight and a melt flow rate (230° C. with 2.16 kg weight) from 1 to 100 g/10 min.

In certain other embodiments, the polyolefin resin may be a low density polyethylene having a density between 0.911 and 0.925 g/cc and melt index (190° C. with 2.16 kg weight) from 0.1 to 100 g/10 min.

In other embodiments, the polyolefin resin may have a crystallinity of less than 50 percent. In preferred embodiments, the crystallinity of the polyolefins may be from 5 to 35 percent. In more preferred embodiments, the crystallinity may range from 7 to 20 percent.

In certain other embodiments, the polyolefin resin is a semi-crystalline polymer and may have a melting point of less than 110° C. In preferred embodiments, the melting point may be from 25 to 100° C. In more preferred embodiments, the melting point may be between 40 and 85° C.

In other embodiments, the polyolefin resin is a glassy polymer and may have a glass transition temperature of less than 110° C. In preferred embodiments, the glass transition temperature may be from 20 to 100° C. In more preferred embodiments, the glass transition temperature may be from 50 to 75° C.

In certain embodiments, the polyolefin resin may have a weight average molecular weight greater than 10,000 g/mole. In other embodiments, the weight average molecular weight may be from 20,000 to 150,000 g/mole; in yet other embodiments, from 50,000 to 100,000 g/mole.

The one or more polyolefin resins may be contained within the aqueous dispersion in an amount from about 1% by weight to about 96% by weight. For instance, the thermoplastic resin may be present in the aqueous dispersion in an amount from about 10% by weight to about 60% by weight, and about 20% to about 50% by weight in another embodiment.

In a particular embodiment, the polyolefin resin may include copolymers and interpolymers of ethylene and/or propylene and other monomers selected from $C_4$ to $C_{10}$ olefins, preferably alpha-olefins, more preferably from $C_4$ to $C_8$ alpha-olefins and most preferably selected from n-butene, n-hexene and n-octene. The ethylene or propylene content of the resin may range from about 2 to 98 weight percent of the resin. In some embodiments, a primarily ethylene-based polyolefin may be selected in which ethylene comprises from about 98 to 50 weight percent of the polyolefin. In other embodiments, a primarily propylene-based or other polyolefin may be selected in which propylene comprises from about 98 to 50 percent of the polyolefin. Selected comonomer(s) may comprise the remainder of the polyolefin.

In one embodiment, the polyolefin resin may include an ethylene-based polyolefin which has a melt index ("MI") determined according to ASTM D1238 (190° C. with a 2.16 kg weight) from about 0.1 to 25 g/10 min; from 0.25 to 22 g/10 min in another embodiment; and from about 0.5 to 18 g/10 min in yet another embodiment. In another embodiment, the polyolefin resin may include a propylene-based polyolefin which has a Melt Flow Rate ("MFR") determined according to ASTM D1238 (230° C. with 2.16 kg weight) of from about 0.25 to 85 g/10 min; from about 0.7 to 70 g/10 min in another embodiment; from about 1.4 to 60 in yet another embodiment; and from about 2 to 50 g/10 min in yet another embodiment.

In one embodiment, the polyolefin resin may comprise an ethylene-based polyolefin having a density ranging from about 0.855 to 0.925 g/cc; from about 0.86 to 0.91 in another embodiment; from about 0.875 to 0.905 in yet another embodiment; and from about 0.86 to 0.90 in yet another embodiment.

One class of polyolefins particularly suited for use herein are copolymers of ethylene and 1-octene or 1-butene, where ethylene comprises from about 50 to 90 percent by weight of the copolymer in one embodiment, and from about 55 to 85 percent by weight of the copolymer in another embodiment and I-octene or 1-butene comprises from about 10 to 50 percent by weight of the copolymer in one embodiment and from about 15 to 45 percent by weight of the copolymer in another example, and where the ethylene copolymer has a Melt Index ranging from about 0.25 to 30 g/10 min in one embodiment, and 0.5 to 20 g/10 min in another embodiment.

Another preferred class of polyolefins includes copolymers of 1-propene and ethylene, 1-octene, 1-hexene or 1-butene, where 1-propene comprises from about 65 to 95 percent by weight of the copolymer in one embodiment in one embodiment, and from about 75 to 93 percent by weight of the copolymer in another embodiment and ethylene, 1-octene, 1-hexene or 1-butene comprise from about 5 to 35 percent by weight of the copolymer in one embodiment, and from about 7 to 25 percent by weight of the copolymer in another embodiment, and wherein the copolymer has a Melt Flow ranging from about 0.7 to 85 g/10 min in one embodiment and from about 1.4 to 55 g/10 min in another embodiment.

Ethylene-based polymers (including homopolymers, copolymer, interpolymers and block interpolymers) useful in embodiments disclosed herein may have a melting temperature ($T_m$) between 25° C. and 130° C. In other embodiments, the ethylene-based polymers may have a melting point of less than 125° C.; less than 115° C. in other embodiments; less than 105° C. in other embodiments; less than 95° C. in other embodiments; less than 85° C. in other embodiments; less than 75° C. in other embodiments; less than 65° C. in other embodiments; and less than 60° C. in yet other embodiments.

Ethylene-based polymers useful in embodiments disclosed herein may have a Vicat softening point (ASTM D 1525) between 25° C. and 130° C. In other embodiments, the ethylene-based polymers may have a Vicat softening point of less than 125° C.; less than 115° C. in other embodiments; less than 105° C. in other embodiments; less than 95° C. in other embodiments; less than 85° C. in other embodiments; less than 75° C. in other embodiments; less than 65° C. in other embodiments; and less than 60° C. in yet other embodiments; less than 55° C. in other embodiments; and less than 45° C. in yet other embodiments.

Ethylene-based polymers useful in embodiments disclosed herein may have a heat deflection temperature under load (DTUL) (ASTM D648, 0.45 MPa load) of at least 45° C. In other embodiments, the ethylene-based polymers may have a DTUL between 45° C. and 130° C. In other embodiments, the ethylene-based polymers may have a DTUL between about 65° C. and about 120° C.; and between about 75° C. and about 110° C. in other embodiments.

Propylene-based polymers (including homopolymers, copolymer, interpolymers and block interpolymers) useful in embodiments disclosed herein may have a melting temperature ($T_m$) between 25° C. and 165° C. In other embodiments, the propylene-based polymers may have a melting point of less than 135° C.; less than 125° C. in other embodiments; less than 115° C. in other embodiments; less than 105° C. in other embodiments; less than 95° C. in other embodiments; less than 90° C. in other embodiments; less than 85° C. in other embodiments; less than 75° C. in other embodiments; less than 65° C. in other embodiments; and less than 60° C. in yet other embodiments.

Propylene-based polymers useful in embodiments disclosed herein may have a Vicat softening point (ASTM D 1525) between 25° C. and 160° C. In other embodiments, the propylene-based polymers may have a Vicat softening point of less than 135° C.; less than 125° C. in other embodiments; less than 115° C. in other embodiments; less than 105° C. in other embodiments; less than 95° C. in other embodiments; less than 90° C. in other embodiments; less than 85° C. in other embodiments; less than 75° C. in other embodiments; less than 65° C. in other embodiments; less than 55° C. in other embodiments; and less than 45° C. in yet other embodiments.

Propylene-based polymers useful in embodiments disclosed herein may have a heat deflection temperature under load (DTUL) (ASTM D648, 0.45 MPa load) of at least 45° C. In other embodiments, the propylene-based polymers may have a DTUL between 45° C. and 130° C. In other embodiments, the ethylene-based polymers may have a DTUL between about 65° C. and about 120° C.; and between about 75° C. and about 110° C. in other embodiments.

Polymers suitable for blending with the above described polymers include thermoplastic and non-thermoplastic polymers including natural and synthetic polymers. Exemplary polymers for blending include ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes.

Suitable conventional block copolymers which may be blended with the polymers disclosed herein may possess a Mooney viscosity (ML 1+4 @ 100° C.) in the range from 10 to 135 in some embodiments; from 25 to 100 in other embodiments; and from 30 to 80 in yet other embodiments. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

Polyolefin dispersions formed in accordance with embodiments disclosed herein are characterized in having an average particle size of between about 0.1 to about 5.0 microns. In other embodiments, dispersions have an average particle size of from about 0.5 µm to about 2.7 µm. In other embodiments, from about 0.8 µm to about 1.2 µm. By "average particle size," the present invention means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes of the particle. Particle sizes may be measured on a Beckman-Coulter LS230 laser-diffraction particle size analyzer or other suitable device.

Dispersed Ethylene-Acid Copolymer

The blended dispersion compositions described herein also contain a dispersed alpha-beta unsaturated carboxylic acid-based polymer. In some embodiments, the alpha-beta unsaturated carboxylic acid-based polymer may include an ethylene-acid copolymer, such as an ethylene-acrylic acid copolymer or an ethylene methacrylic acid copolymer.

The ethylene-acid copolymer used in the blended polyolefin dispersions disclosed herein may be a copolymer of, for example, about 65 to 95 wt. %, preferably about 75 to 85 wt. % of ethylene, and, for example, about 5 to 35 wt. %, preferably about 15 to 25 wt. % of acrylic acid (AA) or methacrylic acid (MA). The ethylene-acid copolymer may have a number average molecular weight (Mn) of, for example, about 2,000 to 50,000, preferably about 4,000 to 10,000, as measured by gel permeation chromatography (GPC).

In some embodiments, the ethylene-acid copolymer may be partially or fully neutralized. For example, greater than about 80% of the carboxyl groups are neutralized with metal ions from Group Ia, IIa, or IIb of the Periodic Table (CAS version).

The ethylene-acid copolymer may be supplied as a solution or fine dispersion of an ammonium salt of the copolymer in an ammoniacal water solution. When the ethylene-acid copolymer is dried, ammonia is given off and then ionized and water sensitive carboxylate groups are converted to largely unionized and less water sensitive free carboxyl groups. However, in other embodiments, neutralization may occur without the presence of any ammonia. In practicing this invention, there is added to the solution or dispersion of the ethylene-acid copolymer an amount of ions of at least one metal from Group Ia, IIa, or IIb of the Periodic Table, preferably, sodium, potassium, lithium, calcium or zinc ions, and most preferably sodium ions, e.g., in the form of their hydroxides. The quantity of such metallic ions may be in the range sufficient to neutralize, for example, greater than 80% by weight, preferably about 90% to 150% by weight of the total carboxyl groups in the copolymer. In other words, excess strong base may be added in some cases. In other embodiments, strong base may be added in an amount sufficient to neutralize up to 200% by weight or higher may be added. In other embodiments strong base may be added in an amount sufficient to neutralize 55%, 60%, 65%, 70%, 75%, 85%, 90%, 95%, 100%, 105%, 110%, 115%, 120%, 125%, 135% by weight of the carboxyl groups in the polymer. The presence of such metallic ions has been found to result in an improvement in certain properties, e.g., coefficient of friction (COF), hot tack, and blocking, without an unacceptable sacrifice of other properties, e.g., low minimum seal temperatures (MST).

Thus, embodiments of the present invention employ partially- to fully-neutralized ethylene-acid copolymers. As noted above, polymers useful for embodiments of the present invention include ethylene-acrylic acid (EAA) and ethylene-methacrylic acid (EMA) copolymers, such as those available under the trademarks PRIMACOR™ (trademark of The Dow Chemical Company), NUCREL™ (trademark of E.I. DuPont de Nemours), and ESCOR™ (trademark of ExxonMobil) and described in U.S. Pat. Nos. 4,599,392, 4,988,781, and 5,938,437, each of which is incorporated herein by reference in its entirety. Other ethylene-carboxylic acid copolymers may also be used. Those having ordinary skill in the art will recognize that a number of other polymers may also be used.

Ethylene-acid copolymer dispersions formed in accordance with embodiments disclosed herein are characterized in having an average particle size of between about 0.01 to about 2.0 microns. In other embodiments, dispersions have an average particle size of from about 0.015 µm to about 1.75 µm; from about 0.02 µm to about 1.5 µm in other embodiments; and from 0.06 µm to about 1 µm in yet other embodiments. In other embodiments, from about 0.08 µm to about 0.8 µm. Particle sizes may be measured, for example, using light scattering techniques, hydrodynamic chromatography, capillary hydrodynamic chromatography, and scanning electron microscopy, for example. These various measurement techniques may be used for as it has been found that the hydrated and dehydrated particle sizes for alpha-beta unsaturated carboxylic acid-based copolymer dispersions are similar, such that the particles may be thought of as (porous) rigid spheres rather than water swollen, hydrated spheres which deflate significantly upon water removal.

It has been found that the nature and concentration of the base employed for the dispersion as well as the concentration of the alpha-beta unsaturated carboxylic acid-based copolymer in the dispersion process may affect final dispersion properties such as pH, conductivity, surface tension, viscosity, stability, etc. For example, the amount of the counterion may affect particle size and particle size distribution. Ammonium, for example, results in an alpha-beta unsaturated carboxylic acid-based copolymer dispersion having a larger particle size than potassium or mixed ions.

In some embodiments, the particle size of the ethylene-acid copolymer dispersions is monomodal. In other embodiments, such as where ammonium is used, the particle size of the ethylene-acid copolymer dispersions is multimodal.

The conditions under which these alpha-beta unsaturated carboxylic acid copolymer dispersions are formed may influence both the particle size and the end-use performance. For example, it has been found for EAA dispersions prepared at 20 weight percent solids have a smaller particle size and greater sizing efficiency than EAA dispersions prepared at 35 weight percent solids, all other variables constant.

Manipulation of the particle size and other properties of the dispersion may advantageously be used to tailor the dispersion or the mixed dispersions disclosed herein to a particular end use. For example, for paper sizing, a particular sizing characteristic may be desired, such as efficacy, printability, and interaction with starch. In some embodiments, a smaller particle size for the alpha-beta unsaturated carboxylic acid copolymer dispersions may be preferred for surface sizing applications, where the smaller particles may be more mobile and more effective in surface coverage per gram of material than larger particles.

Additives

Other conventional additives can be included with the above-described dispersions. These include, but are not limited to, fillers, flame retardants (such as calcium carbonate, aluminum trihydrate (ATH), and magnesium hydroxide), stabilizers, pigments and dyes, mold release agents, and anti-stat agents. Other polymers, glass fibers, or cellulosic based fiber compositions may also be used.

Additives may be combined with the dispersions, or with the thermoplastic resins, stabilizing agents, or fillers used in the dispersion. For example, additives may include a wetting agent, fire retardants, surfactants, anti-static agents, antifoam agent, anti block, wax-based dispersion, pigments, a neutralizing agent, a thickener, a compatibilizer, a brightener, a rheology modifier, a biocide, a fungicide, reinforcing fibers, and other additives known to those skilled in the art. While optional for purposes of the present invention, other components may be highly advantageous for product stability during and after the manufacturing process.

Additives and adjuvants may be included in any formulation comprising the above described polymers, copolymers, interpolymers, and multi-block interpolymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to embodiments of the present disclosure. Thermoplastic compositions according to other embodiments of the present disclosure may also contain organic or inorganic fillers or other additives such as starch, talc, calcium carbonate, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titania. Silane-based or other coupling agents may also be employed for better filler bonding.

The polymers and polymer blend compositions described above may contain processing oils, plasticizers, and processing aids. Rubber processing oils having a certain ASTM designation and paraffinic, napthenic or aromatic process oils are all suitable for use. Generally from 0 to 150 parts, more preferably 0 to 100 parts, and most preferably from 0 to 50 parts of processing oils, plasticizers, and/or processing aids per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salts, especially Group 1 or 2 metal or zinc salts and derivatives thereof.

For conventional TPO, TPV, and TPE applications, carbon black is one additive useful for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 $cm^3/100$ g. Generally, smaller particle sized carbon blacks are employed, to the extent cost considerations permit. For many such applications the present polymers and blends thereof require little or no carbon black, thereby allowing considerable design freedom to include alternative pigments or no pigments at all.

Compositions, including thermoplastic blends according to embodiments of the invention may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are WINGSTAY™ S antioxidant, POLYSTAY™ 100 antioxidant, POLYSTAY™ 100 AZ antioxidant, POLYSTAY™ 200 antioxidant, WINGSTAY™ L antioxidant, WINGSTAY™ LHLS antioxidant, WINGSTAY™ K antioxidant, WINGSTAY™ 29 antioxidant, WINGSTAY™ SN-1 antioxidant, and IRGANOX™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include TINUVIN™ 123, TINUVIN™ 144, TINUVIN™ 622, TINUVIN™ 765, TINUVIN™ 770, and TINUVIN™ 780, available from Ciba Specialty Chemicals, and CHEMISORB™ T944, available from Cytex Plastics, Houston, Tex., USA. A Lewis acid may be additionally included with a HALS compound in order to achieve superior surface quality, as disclosed in U.S. Pat. No. 6,051,681. Other embodiments may include a heat stabilizer, such as IRGANOX™ PS 802 FL, for example.

For some compositions, additional mixing processes may be employed to pre-disperse the heat stabilizers, anti-oxidants, anti-ozonants, carbon black, UV absorbers, and/or light stabilizers to form a masterbatch, and subsequently to form polymer blends therefrom.

Suitable crosslinking agents (also referred to as curing or vulcanizing agents) for use herein include sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628, and 5,248,729.

When sulfur based curing agents are employed, accelerators and cure activators may be used as well. Accelerators are used to control the time and/or temperature required for dynamic vulcanization and to improve the properties of the resulting crosslinked article. In one embodiment, a single accelerator or primary accelerator is used. The primary accelerator(s) may be used in total amounts ranging from about 0.5 to about 4, preferably about 0.8 to about 1.5 phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates, and xanthates. Preferably, the primary accelerator is a sulfenamide. If a second accelerator is used, the secondary accelerator is preferably a guanidine, dithiocarbarnate, or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), and triallyl isocyanurate (TAIC), among others. Use of peroxide crosslinkers and optional coagents used for partial or complete dynamic vulcanization are known in the art and disclosed, for example, in "Peroxide Vulcanization of Elastomer," Vol. 74, No 3, July-August 2001.

When the polymer composition is at least partially crosslinked, the degree of crosslinking may be measured by dissolving the composition in a solvent for specified duration, and calculating the percent gel or unextractable component. The percent gel normally increases with increasing crosslinking levels. For cured articles according to embodiments of the invention, the percent gel content is desirably in the range from 5 to 100 percent.

In some embodiments, additives may also include perfumes, algae inhibitors, anti-microbiological and anti-fungus agents, flame retardants and halogen-free flame retardants, as well as slip and anti-block additives. Other embodiments may include PDMS to decrease the abrasion resistance of the polymer. Adhesion of the polymer may also be improved through the use of adhesion promoters or functionalization or coupling of the polymer with organosilane, polychloroprene (neoprene), or other grafting agents.

In addition to the above, the block ethylene/α-olefin interpolymers also may be used in a manner that is described in the following U.S. Patent Applications, the disclosures of which and their continuations, divisional applications and continuation-in-part applications are incorporated by reference herein in their entirety:

1) "Impact-Modification of Thermoplastics with Ethylene/α-Olefins," U.S. Patent Application Publication No. 20070010616;
2) "Three Dimensional Random Looped Structures Made from Interpolymers of Ethylene/α-Olefins and Uses Thereof," U.S. Patent Application Publication No. 20060198983;
3) "Polymer Blends from Interpolymer of Ethylene/α-Olefin," U.S. Patent Application Publication No. 2006019906;
4) "Viscosity Index Improver for Lubricant Compositions," U.S. Patent Application Publication No. 20060199896;
5) "Fibers Made from Copolymers of Ethylene/α-Olefins," U.S. Patent Application Publication No. 20060199931;
6) "Fibers Made from Copolymers of Propylene/α-Olefins," U.S. Patent Application Publication No. 20060199006;
7) "Adhesive and Marking Compositions Made from Interpolymers of Ethylene/α-Olefins," U.S. Patent Application Publication No. 20060199897;
8) "Compositions of Ethylene/α-Olefin Multi-Block Interpolymers Suitable For Films," U.S. Patent Application Publication No. 20060199912;
9) "Rheology Modification of Interpolymers of Ethylene/α-Olefins and Articles Made Therefrom," U.S. Patent Application Publication No. 20060199908;
10) "Soft Foams Made From Interpolymers of Ethylene/α-Olefins," U.S. Patent Application Publication No. 20060205833;
11) "Low Molecular Weight Ethylene/α-Olefin Interpolymer as Base Lubricant Oil," U.S. Patent Application Serial No. 20060199744;
12) "Foams Made From Interpolymers of Ethylene/α-Olefins," U.S. Patent Application Publication No. 20060199872;
13) "Compositions of Ethylene/α-Olefin Multi-Block Interpolymer For Blown Films with High Hot Tack," U.S. Ser. No. 60/717,982, filed on Sep. 16, 2005;
14) "Cap Liners, Closures and Gaskets From Multi-Block Polymers," U.S. Patent Application Publication No. 20060199911;
15) "Polymer Blends From Interpolymers of Ethylene/α-Olefins," U.S. Patent Application Publication No. 20060211819;
16) "Anti-Blocking Compositions Comprising Interpolymers of Ethylene/α-Olefins," U.S. Patent Application Publication No. 20060199884;
17) "Interpolymers of Ethylene/α-Olefins Blends and Profiles and Gaskets Made Therefrom," U.S. Patent Application Publication No. 20060199905;
18) "Filled Polymer Compositions Made from Interpolymers of Ethylene/α-Olefins and Uses Thereof," U.S. Patent Application Publication No. 20060199887;
19) "Compositions Of Ethylene/α-Olefin Multi-Block Interpolymer For Elastic Films and Laminates," U.S. Patent Application Publication No. 20070078222;
20) "Thermoplastic Vulcanizate Comprising Interpolymers of Ethylene/α-Olefins," U.S. Patent Application Publication No. 20060199910;
21) "Multi-Layer, Elastic Articles," U.S. Patent Application Publication No. 20070092704; and
22) "Functionalized Olefin Interpolymers, Compositions and Articles Prepared Therefrom, and Methods for Making the Same," U.S. Patent Application Publication No. 20060199914.

Stabilizing Agent for the Polyolefin Dispersion

Embodiments of the polyolefin dispersion disclosed herein may include a stabilizing agent to promote the formation of a stable dispersion or emulsion. In selected embodiments, the stabilizing agent may be a surfactant, a polymer (different from the base polymer detailed above), or mixtures thereof. In certain embodiments, the polymer may be a polar polymer, having a polar group as either a comonomer or grafted monomer. In preferred embodiments, the stabilizing agent comprises one or more polar polyolefins, having a polar group as either a comonomer or grafted monomer. Typical polymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of ExxonMobil) and described in U.S. Pat. Nos. 4,599,392, 4,988,781, and 5,938,437, each of which is incorporated herein by reference in its entirety. Other polymers include ethylene ethyl acrylate (EEA) copolymer, ethylene methyl methacrylate (EMMA), and ethylene butyl acrylate (EBA). Other ethylene-carboxylic acid copolymers may also be used. Those having ordinary skill in the art will recognize that a number of other useful polymers may also be used.

Other surfactants that may be used include long chain fatty acids or fatty acid salts having from 12 to 60 carbon atoms. In other embodiments, the long chain fatty acid or fatty acid salt may have from 12 to 40 carbon atoms.

If the polar group of the polymer is acidic or basic in nature, the stabilizing polymer may be partially or fully neutralized with a neutralizing agent to form the corresponding salt. In certain embodiments, neutralization of the stabilizing agent, such as a long chain fatty acid or EAA, may be from 25 to 200% on a molar basis; from 50 to 110% on a molar basis in other embodiments. For example, for EAA, the neutralizing agent is a base, such as ammonium hydroxide or potassium hydroxide, for example. Other neutralizing agents may include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

Additional surfactants that may be useful in the practice of the present invention include cationic surfactants, anionic surfactants, zwitterionic, or non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

In particular embodiments, the dispersing agent or stabilizing agent may be used in an amount ranging from greater than zero to about 60% by weight based on the amount of base polymer (or base polymer mixture) used. For example, long chain fatty acids or salts thereof may be used in an amount ranging from 0.5 to 10% by weight based on the amount of base polymer. In other embodiments, ethylene-acrylic acid or ethylene-methacrylic acid copolymers may be used in an amount from 0.5 to 60% by weight based on polymer. In yet other embodiments, sulfonic acid salts may be used in an amount from 0.5 to 10% by weight based on the amount of base polymer.

The type and amount of stabilizing agent used may also affect end properties of the cellulose-based article formed incorporating the dispersion. For example, articles having improved oil and grease resistance might incorporate a surfactant package having ethylene-acrylic acid copolymers or ethylene-methacrylic acid copolymers in an amount from about 10 to about 50% by weight based on the total amount of base polymer. A similar surfactant package may be used when improved strength or softness is a desired end property. As another example, articles having improved water or moisture resistance might incorporate a surfactant package utilizing long chain fatty acids in an amount from 0.5 to 5%, or ethylene-acrylic acid copolymers in an amount from 10 to 50%, both by weight based on the total amount of base polymer. In other embodiments, the minimum amount of surfactant or stabilizing agent must be at least 1% by weight based on the total amount of base polymer.

Fillers

Embodiments of the dispersions disclosed herein may include a filler as part of the composition. A suitable filler loading in a polyolefin dispersion may be from about 0 to about 600 parts of filler per hundred parts of polyolefin. In certain embodiments, the filler loading in the dispersion may be from about 0 to about 200 parts of filler per hundred parts of a combined amount of the polyolefin and the polymeric stabilizing agent. The filler material may include conventional fillers such as milled glass, calcium carbonate, aluminum trihydrate, talc, antimony trioxide, fly ash, clays (such as bentonite or kaolin clays for example), or other known fillers.

Polyolefin Dispersion Formulations

The polyolefin dispersions, both aqueous and non-aqueous, may be formed using the olefin polymers described above or formulations comprising the same. Polyolefin dispersions formed in accordance with embodiments disclosed herein may include a base polymer, which may comprise at least one polyolefin, and a stabilizing agent, which may comprise at least one polar polyolefin. The olefin polymer, in some embodiments, may include propylene-based polymers, ethylene-based polymers, or combinations thereof.

With respect to the polyolefin and the stabilizing agent, in some embodiments, the at least one polyolefin may comprise between about 30 percent to about 99 percent by weight of the total amount of base polymer and stabilizing agent in the composition. In other embodiments, the at least one polyolefin may comprise between about 50 percent and about 90 percent of the total amount of base polymer and stabilizing agent in the composition. In yet other embodiments, the one or more polyolefins may comprise between about 60 percent and about 80 percent of the total amount of base polymer and stabilizing agent in the composition.

The one or more polyolefin resins may be contained within the aqueous dispersion in an amount from about 1 percent by weight to about 96 percent by weight. In some embodiments, the polyolefin may be present in the aqueous dispersion in an amount from about 10 percent by weight to about 80 percent by weight. In other embodiments, the polyolefin may be present in an amount from about 20 percent to about 70 percent by weight; and, from about 30 percent to about 60 weight percent by weight in yet other embodiments.

Dispersions formed in accordance with embodiments disclosed herein may include a base polymer, which may include at least one polyolefin, a secondary polymeric component, which may include at least one thermoplastic, and a stabilizing agent. The at least one polyolefin, in some embodiments, may comprise from about 30 percent to 95 percent by weight of the total amount of base polymer, secondary polymer, and stabilizing agent in the composition. In other embodiments, the at least one polyolefin may comprise between about 50 percent and about 80 percent by weight; and, between about 60 percent to about 70 percent by weight in yet other embodiments. In some embodiments, the secondary polymeric component may comprise from 1 to 48 percent by weight of the total amount of base polymer, secondary polymer, and stabilizing agent in the composition. In other embodiments, the secondary polymeric component may comprise from 5 to 30 percent by weight; and from 10 to 25 percent by weight in yet other embodiments.

Benefits derived from a polyolefin may also be realized where the polyolefin is used as a minority component in a dispersion. Accordingly, dispersions formed in accordance with other embodiments disclosed herein may include a base polymer, which may include at least one thermoplastic, a secondary polymeric component, which may include at least one polyolefin, and a stabilizing agent. The base polymer, in some embodiments, may comprise from about 30 percent to 95 percent by weight of the total amount of base polymer, polyolefin, and stabilizing agent in the composition. In other embodiments, the base polymer may comprise between about 50 percent and about 80 percent by weight; and, between about 60 percent to about 70 percent by weight in yet other embodiments. In other embodiments, the polyolefin may comprise from 1 to 48 percent by weight of the total amount of base polymer, polyolefin, and stabilizing agent in the composition. In other embodiments, the polyolefin component may comprise from 5 to 30 percent by weight; and from 10 to 25 percent by weight in yet other embodiments.

With respect to the filler, typically, an amount greater than about 0 to about 1000 parts per hundred of the polymer (polymer meaning here the polyolefin combined with the thermoplastic polymer (if any) and the stabilizing agent) is used. In selected embodiments, between about 50 to 250 parts per hundred are used. In other selected embodiments, between about 10 to 500 parts per hundred are used. In still other embodiments, from between about 20 to 400 parts per hundred are used. In other embodiments, from about 0 to about 200 parts per hundred are used.

The solid materials (polyolefin plus thermoplastic polymer (if any) plus stabilizing agent) are preferably dispersed in a liquid medium, which in preferred embodiments is water. In preferred embodiments, sufficient neutralization agent is added to neutralize the resultant dispersion to achieve a pH range of between about 4 to about 14. In preferred embodiments, sufficient base is added to maintain a pH of between about 6 to about 11; in other embodiments, the pH may be between about 8 to about 10.5. Water content of the dispersion is preferably controlled so that the solids content is between about 1% to about 74% by volume. In another embodiment, the solid content is between about 25% to about 74% by volume. In particular embodiments, the solids range may be between about 10% to about 70% by weight. In other particular embodiments, the solids range is between about 20% to about 60% by weight. In particularly preferred embodiments, the solids range is between about 30% to about 55% by weight.

Ethylene-Acid Copolymer Dispersion Formulations

The ethylene-acid copolymer dispersions, both aqueous and non-aqueous, may be formed using the ethylene-acid copolymers described above or formulations comprising the same. Ethylene-acid copolymer dispersions formed in accordance with embodiments disclosed herein may include a first polymer, which may comprise at least one ethylene-acid copolymer and a neutralizing agent.

In certain embodiments, neutralization of the base polymer is performed such that greater than about 80% by weight of the neutralizable groups are neutralized. In other embodiments, 90%-150% by weight may be neutralized. In other embodiments strong base may be added in an amount sufficient to neutralize 55%, 60%, 65%, 70%, 75%, 85%, 90%, 95%, 100%, 105%, 110%, 115%, 120%, 125%, 135% by weight of the carboxyl groups in the polymer. In some embodiments, mixtures of strong bases, or mixtures of strong and weak bases, may be used for higher neutralization percentages. Again, as used herein, a "strong base" refers to a compound or compounds having a pKa of about 10 or greater. For example, for EAA, the neutralizing agent may be potassium hydroxide. Other neutralizing agents may include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

In still other embodiments, neutralization of the base polymer is performed such that greater than about 30% by weight of the neutralizable groups are neutralized. In other embodiments, greater than about 35%, 40%, 45%, 50%, or 55% by weight of the neutralizable groups are neutralized.

The one or more ethylene-acid copolymer resins may be contained within the dispersion in an amount from about 1 percent by weight to about 96 percent by weight. In some embodiments, the ethylene-acid copolymer may be present in an aqueous dispersion in an amount from about 10 percent by weight to about 80 percent by weight. In other embodiments, the ethylene-acid copolymer may be present in an amount from about 20 percent to about 70 percent by weight; and, from about 30 percent to about 60 weight percent by weight in yet other embodiments.

Ethylene-acid copolymer dispersions disclosed herein may also include fillers. With respect to the filler, typically, an amount greater than about 0 to about 1000 parts per hundred of the polymer (polymer meaning here the polyolefin combined with the thermoplastic polymer (if any) and the stabilizing agent) is used. In selected embodiments, between about 50 to 250 parts per hundred are used. In other selected embodiments, between about 10 to 500 parts per hundred are used. In still other embodiments, from between about 20 to 400 parts per hundred are used. In other embodiments, from about 0 to about 200 parts per hundred are used.

The solid materials (polyolefin plus thermoplastic polymer (if any) plus stabilizing agent) are preferably dispersed in a liquid medium, which in preferred embodiments is water. In preferred embodiments, sufficient neutralization agent is added to neutralize the resultant dispersion to achieve a pH range of between about 4 to about 14. In preferred embodiments, sufficient base is added to maintain a pH of between about 6 to about 11; in other embodiments, the pH may be between about 8 to about 10.5. Water content of the dispersion is preferably controlled so that the solids content is between about 1% to about 74% by volume. In another embodiment, the solid content is between about 25% to about 74% by volume. In particular embodiments, the solids range may be between about 10% to about 70% by weight. In other particular embodiments, the solids range is between about 20% to about 60% by weight. In particularly preferred embodiments, the solids range is between about 30% to about 55% by weight.

Forming the Dispersions

The dispersions of the present invention may be formed by any number of methods recognized by those having skill in the art. In selected embodiments, the dispersions may be formed by using techniques, for example, in accordance with the procedures as described in WO2005/021638, which is incorporated by reference in its entirety. Dispersions to be blended should each be formed in compatible fluids (e.g., each should be aqueous or in a water-compatible liquid, or each should be a non-aqueous dispersion in compatible organic fluids). Aqueous dispersions, as described herein, are essentially solvent-free dispersions.

In a specific embodiment, a polymer as described above, a stabilizing agent, and a filler are melt-kneaded in an extruder along with water and a neutralizing agent, such as ammonia, potassium hydroxide, or a combination of the two, to form a dispersion. Those having ordinary skill in the art will recognize that a number of other neutralizing agents may be used. In some embodiments, the filler may be added after blending the base polymer and stabilizing agent. In some embodiments, the dispersion is first diluted to contain about 1 to about 3% by weight water and then, subsequently, further diluted to comprise greater than about 25% by weight water.

Any melt-kneading means known in the art may be used. In some embodiments, a kneader, a BANBURY® mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. No. 5,756,659 and U.S. Pat. No. 6,455,636.

An extrusion apparatus that may be used in embodiments of the invention may be described as follows. An extruder, in certain embodiments a twin screw extruder, is coupled to a back pressure regulator, melt pump, or a gear pump. Embodiments also provide a base reservoir and an initial water reservoir, each of which includes a pump. Desired amounts of base and initial water are provided from the base reservoir and the initial water reservoir, respectively. Any suitable pump may be used, but in some embodiments a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

Polymer resin(s), in the form of pellets, powder, or flakes, for example, is fed from the feeder to an inlet of the extruder where the resin is melted or compounded. In some embodiments, the stabilizing agent is added to the resin through and along with the resin and in other embodiments, the stabilizing agent is provided separately to the twin screw extruder. The resin melt is then delivered from the mix and convey zone to an emulsification zone of the extruder where the initial amount of water and base from the reservoirs is added through the inlet. In some embodiments, stabilizing agent may be added additionally or exclusively to the water stream.

In some embodiments, the emulsified mixture is further diluted with additional water inlet from the reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated.

Blended Polyolefin Dispersions

Blended polyolefin dispersions may be formed by blending one or more polyolefin dispersions with one or more ethylene-acid copolymer dispersions. Additives, fillers, and other optional components may also be added to the blended polyolefin dispersions described herein, or may be added to the individual dispersions prior to admixture, as described above. Dispersions to be blended should each be formed in compatible fluids (e.g., each should be aqueous or in a water-compatible liquid, or each should be a non-aqueous dispersion in compatible organic fluids).

Embodiments of the blended polyolefin dispersions may be formed where the one or more polyolefin dispersions form the majority dispersion component. In other embodiments, the one or more ethylene-acid copolymer dispersions may form the majority dispersion component.

Blending of the polyolefin and ethylene-acid copolymer dispersions may be performed by any appropriate mixing process. Blending, in various embodiments, may be performed by simple admixture of the dispersions, use of an in-line static mixer, or use of an agitation device, such as a blender, mixer, impeller, pumps, or other means to provide agitation known to those skilled in the art.

Froths and foams comprising the blended dispersion may also be formed, as disclosed in PCT Application Publication No. WO 2005/21622. The dispersed polymers may also be crosslinked by any known means, such as the use of peroxide, electron beam, silane, azide, or other cross-linking technique. The polymers may also be chemically modified, such as by grafting (for example by use of maleic anhydride (MAH), silanes, or other grafting agent), halogenation, amination, sulfonation, or other chemical modification.

Accordingly, dispersion formulations may also include surfactants, frothing agents, dispersants, thickeners, fire retardants, pigments, antistatic agents, reinforcing fibers, antifoam agent, anti block, wax-dispersion, antioxidants, a neutralizing agent, a rheology modifier, preservatives, biocides, acid scavengers, a wetting agent, and the like. While optional for purposes of the present invention, other components may be highly advantageous for product stability during and after the manufacturing process.

In addition, embodiments described herein optionally include a filler wetting agent. A filler wetting agent generally may help make the filler and the polyolefin dispersion more compatible. Useful wetting agents include phosphate salts, such as sodium hexametaphosphate. A filler wetting agent may be included in a composition of the present invention at a concentration of at least about 0.5 parts per 100 parts of filler, by weight.

Furthermore, embodiments of the present invention may optionally include a thickener. Thickeners may be useful in the present invention to increase the viscosity of low viscosity dispersions. Thickeners suitable for use in the practice of the present invention may be any known in the art such as for instance poly-acrylate type or associate non ionic thickeners such as modified cellulose ethers. For example, suitable thickeners include ALCOGUM™ VEP-II (trademark of Alco Chemical Corporation), RHEOVIS™ and VISCALEX™ (trademarks of Ciba Ceigy), UCAR® Thickener 146, ETHOCEL™, or METHOCEL™ (trademarks of the The Dow Chemical Company), PARAGUM™ 241 (trademarks of Para-Chem Southern, Inc.), BERMACOL™ (trademark of Akzo Nobel), or AQUALON™ (trademark of Hercules) or ACUSOL® (trademark of Rohm and Haas). Thickeners may be used in any amount necessary to prepare a dispersion of desired viscosity.

The ultimate viscosity of the dispersion is, therefore, controllable. Addition of the thickener to the dispersion including the amount of filler may be done with conventional means to result in viscosities as needed. Viscosities of the dispersions may reach +3000 cP (Brookfield spindle 4 with 20 rpm) with moderate thickener dosing (up to 4%, preferably below 3%, based on 100 phr of polymer dispersion). The starting polymer dispersion as described has an initial viscosity prior to formulation with fillers and additives between 20 and 1000 cP (Brookfield viscosity measured at room temperature with spindle RV3 at 50 rpm). Still more preferably, the starting viscosity of the dispersion may be between about 100 to about 600 cP.

Also, embodiments disclosed herein are characterized by their stability when fillers are added to the polymer/stabilizing agent. In this context, stability refers to the stability of viscosity of the resultant aqueous polyolefin dispersion. In order to test the stability, the viscosity is measured over a period of time. Preferably, viscosity measured at 20° C. should remain +/−10% of the original viscosity over a period of 24 hours, when stored at ambient temperature.

The aqueous dispersions may contain particles having an average particle size of from about 0.01 to about 5 microns. The coatings obtained therefrom exhibit excellent moisture resistance, water repellency, oil and grease resistance, thermal adhesion to cellulose-based compositions, such as paper, and other natural and synthetic substrates such as polymers, metals or metal alloys, wood, glass, ceramics, synthetic fibers and films, and woven and non-woven fabrics. Polymeric and film substrates may be non-oriented, oriented, or biaxially oriented.

The aqueous dispersions disclosed herein may be used as coatings, froths, as articles such as foams, and adhesives for bonding and sealing various substrates, especially corrugated boxes and plastics films such as BOPP, polyester and polyamide films. Aqueous dispersion of the present invention may be used for such applications as a binder of a coating or ink composition for a coated paper, paper-board, wall-paper, or other cellulose based article. The aqueous dispersion may be coated by various techniques, for example, by spray coating, curtain coating, coating with a roll coater or a gravure coater, brush coating, or dipping. The coating is preferably dried by heating the coated substrate to 70-150° C. for 1 to 300 seconds.

The dispersions used to form the blended polyolefin dispersions described herein may be of the same or differing particle sizes. In some embodiments, the blended dispersion, having a base fluid (A), may include dispersed olefin-based polymer particles (B) greater in size than the dispersed alpha-beta unsaturated carboxylic acid-based polymer (C). In some embodiments, the average diameter of the particles (B) may be twice the average diameter of the particles (C), as measured by the above described light scattering techniques. In other various embodiments, the average diameter of the particles (B) may be 3, 4, 5, 6, 7, 8, 9, 10, 15, or 20 times the average diameter of the particles (C), as measured by the above described light scattering techniques.

The dispersions used to form the blended polyolefin dispersions described herein may include base polymers of the same or differing number average molecular weights. In some embodiments, the blended dispersion, having a base fluid (A), may include a dispersed olefin-based polymer (B) having a number average molecular weight equal to or greater than the number average molecular weight of a dispersed alpha-beta unsaturated carboxylic acid-based polymer (C). In some embodiments, the number-average molecular weight of (B) may be at least 1.2 times the number average molecular weight of (C), as measured by gel permeation chromatography (GPC). In other various embodiments, the number average molecular weight of (B) may be at least 1.3, 1.4, 1.5, 1.6, 1.7, 1.8, 1.9, 2, 2.25, 2.5, 3, 4, or 5 times the number average molecular weight of (C), as measured by GPC.

Froths and Foams

In particular embodiments, it may be desired to utilize the dispersion in the form of foam. When preparing foams, it is often preferred to froth the dispersion. For example, a froth and foam may be prepared as described in WO2005/021622, which is fully incorporated herein by reference. Preferred in the practice of this invention is the use of a gas as a frothing agent. Examples of suitable frothing agents include: gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed dispersion, it is preferred to mix all components and then blend the air or gas into the mixture, using equipment such as an OAKES, MONDO, or FIRESTONE frother.

Coated or impregnated substrates may, in some embodiments, be contacted with a froth or foam formed from dispersions disclosed herein. Embodiments disclosed herein may use a froth stabilizing surfactant to promote the formation of a stable dispersion and to aid in frothing. Creating and stabilizing the froth during the frothing and drying steps may be accomplished by addition of a frothing surfactant to the aqueous dispersion of the polyolefin resin when initially creating the froth. In addition, these surfactants may also be used to improve aqueous wetting of dried foams, if desired. Suitable frothing surfactants may be selected from cationic, nonionic and anionic surfactants. In one embodiment, an anionic surfactant may be used.

In some embodiments, the frothing surfactant may be an alkylcellulose ethers, hydroxyalkyl cellulose ethers, hydroxyalkyl alkylcellulose ethers, guar gum, xanthan gum, and polyoxyethylene resins of at least 20,000 molecular weight, or combinations thereof. Other suitable frothing surfactants may be selected from cationic surfactants, anionic surfactants, or a non-ionic surfactants. Examples of cationic surfactants include quaternary amines, primary amine salts, diamine salts, and ethoxylated amines. Examples of nonionic surfactants include block copolymers containing ethylene oxide, silicone surfactants, alkylphenol ethoxylates, and linear and secondary alcohol ethoxylates of alkyl group containing more than 8 carbon atoms.

Examples of anionic surfactants include sulfonates, carboxylates, and phosphates. In one embodiment, anionic surfactants useful in preparing the froth from the aqueous dispersion may be selected from carboxylic acid salts and ester amides of carboxylic fatty acids, preferably fatty acids comprising from 12-36 carbon atoms, e.g., stearic or lauric acid, palmitic, myristic, oleic, linoleic, ricinoleic, erucic acid and the like.

In some embodiments, the surfactant may include amphoteric surfactants such as aminopropionates, amphoteric sulfonates, betaines, imidazoline based amphoterics, and sultaines, among others. For example, the surfactant may be derived from an imidazoline and can either be the acetate form (containing salt) or the propionate form (salt-free). Examples of suitable amphoteric surfactants include surfactants such as lauramidopropyl betaine, sodium laurimino dipropionate, cocoamidopropyl hydroxyl sultaine, alkylether hydroxypropyl sultaine, sodium capryloampho hydroxypropyl sulfonate, disodium capryloampho dipropionate, sodium cocoamphoacetate, disodium cocoamphodiacetate, sodium cocoamphopropionate, disodium octyl iminodipropionate, sodium cocoampho hydroxypropyl sulfonate, disodium lauryl iminodipropionate, sodium stearoampho acetate, and disodium tallow iminodipropionate, among others. Other amphoteric surfactants known in the art may also be used.

Surfactants useful as a froth stabilizing agent may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

Surfactants useful for preparing a stable froth may also be referred to herein as foam stabilizers. Those having ordinary skill in this field will recognize that a number of foam stabilizers may be used. Foam stabilizers may include, for example, sulfates, succinamates, and sulfosuccinamates.

Examples of aqueous dispersions that may be incorporated into the additive composition of the present disclosure are disclosed, for instance, in U.S. Patent Application Publication No. 2005/0100754, U.S. Patent Application Publication No. 2005/0192365, PCT Publication No. WO 2005/021638, and PCT Publication No. WO 2005/021622, which are all incorporated herein by reference.

Some embodiments of the foams formed from the aqueous dispersion disclosed herein may have a compression set value, as defined below, at testing conditions of 80° C., 20 minutes, and 0.5 psig, of less than 80 percent. In other embodiments, the foams may have a compression set of less than 70 percent; less than 65 percent in other embodiments; and less than 60 percent in yet other embodiments.

Some embodiments of the foams formed from the aqueous dispersion disclosed herein may have a compression set value, as defined below, at testing conditions of 80° C., 20 minutes, and 0.25 psig, of less than 70 percent. In other embodiments, the foams may have a compression set of less than 60 percent; less than 55 percent in other embodiments; and less than 50 percent in yet other embodiments.

Some embodiments of the foams formed from the aqueous dispersion disclosed herein may have a compression set value, as defined below, at testing conditions of 80° C., 20 minutes, and 0.1 psig, of less than 60 percent. In other embodiments, the foams may have a compression set of less than 50 percent; less than 45 percent in other embodiments; and less than 40 percent in yet other embodiments.

EXAMPLES

Ethylene-Acid Copolymer Dispersion 100 parts by weight of a thermoplastic ethylene/acrylic acid copolymer with an acrylic acid content of 20.5 wt %, a density of about 0.958 g/cm3 (ASTM D-792) and a melt index of 13.5 g/10 min. (as determined according to ASTM D1238 at 125° C. and 2.16 kg) a Mw/Mn of about 3.7, and a melting point of about 77° C. (as determined by DSC at a scanning rate of about 10° C. per minute), commercially available as PRIMACOR 59801 from The Dow Chemical Company, is melt kneaded at 125° C. in twin screw extruder at a rate of 9.1 kg/hr.

To the melt kneaded resin, 45 wt. % aqueous solution of potassium hydroxide is continuously fed into a downstream injection port at a rate 1.8 kg/hr (at a rate of 16.5 wt % of the total mixture). The resultant aqueous dispersion is subsequently diluted with additional water at a rate of 26.9 kg/hr before exiting the extruder. An aqueous dispersion having a solids content of 26.6 wt %, a pH of 9.9, and a Brookfield viscosity of 224 cp (RV3 spindle, 21.5° C., 50 rpm) is thus obtained.

Polyolefin Dispersion 1

An aqueous dispersion of an ethylene-octene interpolymer having hard and soft segments is formed in accordance with the procedures as described in WO2005/021638 and briefly described above. Dispersion 1 is formed using an ethylene-octene interpolymer having the following properties as shown below:

| (g/cc) | MI | I10 | I10/MI | $T_c$ (°C.) | $T_m$ (°C.) | Heat of Fusion (J/g) | Cryst (wt %) | $T_{CRYS}$ TAF (°C.) | $T_m$ - $T_{CRYS}$ TAF (°C.) | DSC Soft Segment Density | DSC Hard Segment Density (g/cc) | DSC Wt % Soft Seg | DSC wt % Hard Seg |
|---|---|---|---|---|---|---|---|---|---|---|---|---|---|
| 0.877 | 4.7 | 31.5 | 6.7 | 97 | 119 | 52 | 18 | 48 | 72 | 0.858 | 0.943 | 76 | 24 |

| DSC Wt % Soft Segment with fixed HS density (0.96 g/cc) | DSC wt % Hard Segment with fixed HS density (0.96 g/cc) | [Zn]/[C2]*1000 | Zn level in polymer (ppm) |
|---|---|---|---|
| 79 | 21 | 2.53 | 491 |

The surfactant system used is UNICID™ 350 (a $C_{2-6}$ carboxylic acid obtained from Baker-Petrolite, acid value 115 mg KOH/g). UNICID™ is used at a loading of 3 weight percent based on the weight of the ethylene-octene interpolymer. The addition for all other ingredients is also based on the weight of the ethylene-octene interpolymer.

The ethylene-octene interpolymer is dry blended with the surfactant. The mixture is then extruded at 4.5 kg/h (10 lbs/h) using a Berstorff ZE25 (36 L/D, 450 rpm) and a Schenck Mechatron loss-in-weight feeder. An ISCO dual-syringe pump meters a 45% (w/w) potassium hydroxide solution at 0.9 cc/min and DI water at 1.2 cc/min. The potassium hydroxide solution and deionized (DI) water are mixed and preheated through a 24 inch core/shell heat exchanger (20 foot ⅛ inch tubing core) tempered by a DC200 silicone oil bath set at 150° C. and fed to the initial aqueous (IA) injector. Dilution water is delivered to the dilution water injector at a rate of 100 cc/min using an ISCO dual syringe pump. The dilution water is also passed through a similar pre-heater set at 150° C. Back pressure on the barrel is provided via a GO (Circor) BP-60 back-pressure regulator adjusted to maintain about 17.2 bar (250 psig) upstream pressure.

The dispersion product is collected directly after the back-pressure regulator, allowed to cool, filtered, and analyzed for particle size, pH, solids content, and viscosity. The aqueous dispersion produced has a solids content of 55 weight percent, a pH of 11.4, and a viscosity (RV-2 spindle, 22.5° C., 100 rpm) of 65 centipoise. The dispersed polymer phase measured by a Coulter LS230 particle analyzer consists of an average volume diameter particle size of 0.6 microns.

Polyolefin Dispersion 2

100 parts by weight of a thermoplastic ethylene/1-octene copolymer with an octene content of about 38 weight percent, a density of about 0.87 g/cc (ASTM D-792) and a melt index of about 5 g/10 minutes (as determined according to ASTM D1238 at 190° C. and 2.16 kg) a Mw/Mn of about 2.0, and a melting point of about 63° C. (as determined by DSC at a scanning rate of about 10° C. per minute), commercially available from The Dow Chemical Co., Midland, Mich., as ENGAGE 8200, and 3.1 parts by weight of a $C_{18}/C_{16}$ carboxylic acid (INDUSTRENE 106 manufactured by CK Witco, acid value 200 mg KOH/g) are melt kneaded at 125° C. in a twin screw extruder at a rate of 7.9 kg/hr.

Upon the melt kneaded resin/surfactant, 23.9 weight percent aqueous solution of potassium hydroxide is continuously fed into a downstream injection port at a rate 0.2 kg/hr (at a rate of 2.5 weight percent of the total mixture). This aqueous dispersion is subsequently diluted with additional water at a rate of 5.4 kg/hr before exiting the extruder. To further dilute the resulting dispersion, additional water is added at a rate of 0.7 kg/hr after the mixture exited the extruder. An aqueous dispersion having a solids content of 56 weight percent at pH 9.6 is obtained. The dispersed polymer phase measured by a Coulter. LS230 particle analyzer consisted of an average volume diameter of 2.04 micron and a particle size distribution (Dv/Dn) of 1.18.

Polyolefin Dispersion 3

100 parts by weight of a thermoplastic propylene-ethylene copolymer with an ethylene content of about 12.7 weight percent, a density of about 0.864 g/cc (ASTM D-792) and a melt flow rate of about 23 g/10 minutes (as determined according to ASTM D1238 at 230° C. and 2.16 kg), a melting point of 60-70° C., a Mw/Mn of about 2.0, and a flexural modulus of about 4 kpsi, and 6.4 parts by weight of a $C_{26}$ carboxylic acid (UNICID 350 manufactured by Baker-Petrolite, acid value 115 mg KOH/g) are melt kneaded at 150° C. in a twin screw extruder at a rate of 1.6 kg/hr.

Upon the melt kneaded resin/surfactant, 25 weight percent aqueous solution of potassium hydroxide is continuously fed into a downstream injection port at a rate 0.08 kg/hr (at a rate of 4.8 weight percent of the total mixture). This aqueous dispersion is subsequently diluted with additional water at a rate of 1.5 kg/hr before exiting the extruder. An aqueous dispersion having a solids content of 51 weight percent at pH 11.6 is obtained. The dispersed polymer phase measured by a Coulter LS230 particle analyzer consisted of an average volume diameter of 0.61 micron and a particle size distribution (Dv/Dn) of 1.31.

Blended Dispersions

Blended dispersions are formed using the above-described ethylene-acid copolymer and polyolefin dispersions according to the formulations given in Table 1. Blended dispersions are formed by blending the respective dispersions using light agitation.

TABLE 1

| Sample | Blend 1 | Blend 2 | Blend 3 | Blend 4 |
|---|---|---|---|---|
| Ethylene-Acid Copolymer Dispersion | 20 wt % | 15 wt. % | 5 wt. % | 10 wt. % |
| Polyolefin Dispersion 1 | 80 wt. % | | | 60 wt. % |
| Polyolefin Dispersion 2 | | 85 wt. % | | |
| Polyolefin Dispersion 3 | | | 95 wt. % | 30 wt. % |

Advantageously, the present invention provides for blended polyolefin dispersions. In some embodiments the dispersions may be aqueous. Coatings and articles produced from the blended dispersions disclosed herein may advantageously have a higher heat resistance, a greater resistance to compression set at elevated temperatures, and may exhibit a broader operating window in various extrusion and molding process.

Further, the blended dispersions may have properties, resulting from the selected admixture, that are greater extent than the sum of what would be expected when the two are added together or when the same polymers are formed in a single dispersion. Such a synergistic effect may be realized due to the intimate admixture of the various particles in the dispersions, retaining individual characteristics of the component dispersions, but blended so as to intimately commingle with a second particle phase.

These blended polyolefin dispersions may be used as coatings and as articles such as froths and foams. Alternative uses for these blended polyolefin dispersions include adhesives for bonding and sealing various substrates, especially corrugated boxes and plastics films such as biaxially oriented polypropylene (BOPP), polyester and polyamide films. Additionally, foams formed from these blended polyolefin dispersions may be used in the construction of diapers and feminine hygiene pads as the liquid absorbent and distribution layer. Today, such diapers and feminine hygiene pads are packaged tightly. Foams formed from dispersions disclosed herein may provide significantly lower compression set at 40° C., allowing near full recovery of the original foam thickness, a requirement for the end product.

In another aspect, the blended polyolefin dispersions may be used as a coating or adhesive where heat resistance is required. Many automotive applications require heat resistance at temperatures of 60° C. and higher. A dispersions produced using a standard metallocene-based ethylene-octene copolymer having density of 0.870 g/cc and a melt index (12 at 190° C.) of 5 g/10 min. will fail as a coating or adhesive at temperatures of 60° C. and higher. A coating or adhesive based on embodiments of the blended polyolefin dispersions disclosed herein may achieve sufficient heat resistance.

In addition to the mechanical emulsification of a single multi-block interpolymer, blends of different multi-block interpolymers and blends of multi-block interpolymers and other polyolefins and plastics may be produced to enhance certain properties such as adhesion to specific substrates such as paper or glass and heat resistance.

In another embodiment of the present invention, a dispersion of catalytic lineal multi-block olefins may be used in connection with other dispersions to form a blended dispersion product.

In another embodiment of the present invention, a dispersion of catalytic linear multi-block olefins may be dispersed into a monomer, such as acrylonitrile. This monomer may be later polymerized, which has the effect of dispersing the multi-block olefin polymer in a secondary polymer.

In one application, blended polyolefin dispersions may be useful in cellulose-based articles, especially having a specific volume of less than 3 cc/gm, for example, paper and board structures, incorporating a compound comprising an aqueous polyolefin dispersion resulting in articles having improved properties. In various embodiments, the articles can have improved oil and grease resistance, improved water resistance, controlled coefficients of friction, thermal embossability, thermal formability, improved wet and dry strength, or an improved softness, among others. Such techniques and compositions are disclosed in U.S. Application Ser. No. 60/750, 466, which is expressly incorporated by reference in its entirety.

In another application, blended polyolefin dispersions may be useful in providing a cellulose-based article having, especially those having a specific volume of less than 3 cc/gm, including: a cellulose-based composition; and an applied compound. The applied compound, at the time of application, may include a blended polyolefin dispersions. The article may have an oil and grease resistance value of at least 9 as measured using the Kit test at an exposure time of 15 seconds.

In another application, blended polyolefin dispersions may be useful in providing a cellulose-based article, especially those having a specific volume of less than 3 cc/gm, including: a cellulose-based composition; and an applied compound. The applied compound, at the time of application, may include a blended polyolefin dispersions. The cellulose-based article may have a water resistance value of less than about 10 g/m²/120 seconds as measured via the Cobb test.

The Kit test: the kit value of samples may be determined using TAPPI T559 cm-02. The test was performed flat as described in the TAPPI test. This involves putting five separate drops of oil onto the board's surface and inspecting the board after a specified amount of exposure time (15 seconds) to see if any pronounced darkening of the paper appears. A modified Kit test run at elevated temperature(s) may be useful in analyzing the performance of the deposited blended polyolefin dispersions. Such elevated temperatures for testing can be as high as about 80° C., but preferably tested around 50° C. Film layers made using deposited blended polyolefin dispersions may show higher Kit values at 50° C. than Kit values (also at 50° C.) for random ethylene polymer based deposited dispersions, even at similar overall ethylene polymer density and melt index.

The Cobb test: Cobb tests may be performed in accordance with ASTM D3285-93. The exposure time was 2 minutes. The test involves a known volume of water (100 ml) being poured onto a specific area of the board's surface (100 cm²). The board is weighed before and after the exposure and the difference between the two can then be expressed as the weight per unit area of water absorbed in that given time; the lower the Cobb value, the better the result. A modified Cobb test run at elevated temperature(s) may be useful in analyzing the performance of the deposited blended polyolefin dispersions. Such elevated temperatures for testing can be as high as about 80° C., but preferably tested around 50° C. Film layers made using deposited dispersions blended polyolefin dispersions may show lower Cobb values at 50° C. than Cobb values (also at 50° C.) for random ethylene polymer based deposited dispersions, even at similar overall ethylene polymer density and melt index.

Thus, embodiments disclosed herein may relate to cellulose-based compositions, which are generally referred to as "paper and/or paperboard products" (i.e., other than paper towels), such as newsprint, uncoated groundwood, coated groundwood, coated free sheet, uncoated free sheet, packaging and industrial papers, linerboard, corrugating medium, recycled paperboard, bleached paperboard, writing paper, typing paper, photo quality paper, wallpaper, etc. Such compositions can generally be formed in accordance with the present invention from at least one paper web.

For example, in one embodiment, the paper product can contain a single-layered paper web formed from a blend of fibers. In another embodiment, the paper product can contain a multi-layered paper (i.e., stratified) web. Furthermore, the paper product can also be a single- or multi-ply product (e.g., more than one paper web), wherein one or more of the plies may contain a paper web formed according to the present invention. Normally, the basis weight of a paper product of the present invention is between about 10 to about 525 grams per square meter (gsm). Normally, the specific volume of a paper product in accordance with embodiments of the present invention is between about 0.3 to about 2 grams per cubic centimeter (g/cc).

Any of a variety of materials can be used to form the paper products of the present invention. For example, the material used to make paper products can include fibers formed by a variety of pulping processes, such as kraft pulp, sulfite pulp, thermomechanical pulp, etc.

Papermaking fibers useful in the process of the present invention include any cellulosic fibers that are known to be useful for making cellulosic base sheets. Suitable fibers include virgin softwood and hardwood fibers along with nonwoody fibers, as well as secondary (i.e., recycled) papermaking fibers and mixtures thereof in all proportions. Non-cellulosic synthetic fibers can also be included in the aqueous suspension. Papermaking fibers may be derived from wood using any known pulping process, including kraft and sulfite chemical pulps.

Fibers suitable for making paper webs comprise any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers can be prepared in high-yield or low-yield forms and can be pulped in any known method, including kraft, sulfite, high-yield pulping methods and other known pulping methods. Fibers prepared from organosolv pulping methods can also be used, including the fibers and methods disclosed in U.S. Pat. No. 4,793,898, issued Dec. 27, 1988 to Laamanen et al.; U.S. Pat. No. 4,594,130, issued Jun. 10, 1986 to Chang et al.; and U.S. Pat. No. 3,585,104. Useful fibers can also be produced by anthraquinone pulping, exemplified by U.S. Pat. No. 5,595,628 issued Jan. 21, 1997, to Gordon et al.

In one embodiment, a portion of the fibers, such as up to 50% or less by dry weight, or from about 5% to about 30% by dry weight, can be synthetic fibers such as rayon, polyolefin fibers, polyester fibers, bicomponent sheath-core fibers, multi-component binder fibers, and the like. An exemplary polyethylene fiber is PULPEX®, available from Hercules, Inc. (Wilmington, Del.). Any known bleaching method can be used. Synthetic cellulose fiber types include rayon in all its varieties and other fibers derived from viscose or chemically-modified cellulose. Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500. In some other embodiments, portions of the fibers up to about 90% by dry weight may be synthetic fibers.

Other papermaking fibers that can be used in the present disclosure include paper broke or recycled fibers and high yield fibers. High yield pulp fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

In some embodiments, the pulp fibers may include softwood fibers having an average fiber length of greater than 1 mm and particularly from about 2 to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and the like. Exemplary commercially available pulp fibers suitable for the present invention include those available from Neenah Paper Inc. under the trade designations "LONGLAC-19."

In some embodiments, hardwood fibers, such as eucalyptus, maple, birch, aspen, and the like, can also be used. In certain instances, eucalyptus fibers may be particularly desired to increase the softness of the web. Eucalyptus fibers can also enhance the brightness, increase the opacity, and change the pore structure of the paper to increase the wicking ability of the paper web. Moreover, if desired, secondary fibers obtained from recycled materials may be used, such as fiber pulp from sources such as, for example, newsprint, reclaimed paperboard, and office waste. Further, other natural fibers can also be used in the present invention, such as abaca, sabai grass, milkweed floss, pineapple leaf, and the like. In addition, in some instances, synthetic fibers can also be utilized. Some suitable synthetic fibers can include, but are not limited to, rayon fibers, ethylene vinyl alcohol copolymer fibers, polyolefin fibers, polyesters, and the like.

As stated, the paper product of the present invention can be formed from one or more paper webs. The paper webs can be single-layered or multi-layered. For instance, in one embodiment, the paper product contains a single-layered paper web layer that is formed from a blend of fibers. For example, in some instances, eucalyptus and softwood fibers can be homogeneously blended to form the single-layered paper web.

In another embodiment, the paper product can contain a multi-layered paper web that is formed from a stratified pulp furnish having various principal layers. For example, in one embodiment, the paper product contains three layers where one of the outer layers includes eucalyptus fibers, while the other two layers include northern softwood kraft fibers. In another embodiment, one outer layer and the inner layer can contain eucalyptus fibers, while the remaining outer layer can contain northern softwood kraft fibers. If desired, the three principle layers may also include blends of various types of fibers. For example, in one embodiment, one of the outer layers can contain a blend of eucalyptus fibers and northern softwood kraft fibers. However, it should be understood that the multi-layered paper web can include any number of layers and can be made from various types of fibers. For instance, in one embodiment, the multi-layered paper web can be formed from a stratified pulp furnish having only two principal layers.

In accordance with the present invention, various properties of a paper product such as described above, can be optimized. For instance, strength (e.g., wet tensile, dry tensile, tear, etc.), softness, lint level, slough level, and the like, are some examples of properties of the paper product that may be optimized in accordance with the present invention. However, it should be understood that each of the properties mentioned above need not be optimized in every instance. For example, in certain applications, it may be desired to form a paper product that has increased strength without regard to softness.

In this regard, in one embodiment of the present invention, at least a portion of the fibers of the paper product can be treated with hydrolytic enzymes to increase strength and reduce lint. In particular, the hydrolytic enzymes can randomly react with the cellulose chains at or near the surface of the papermaking fibers to create single aldehyde groups on the fiber surface which are part of the fiber. These aldehyde groups become sites for cross-linking with exposed hydroxyl groups of other fibers when the fibers are formed and dried into sheets, thus increasing sheet strength. In addition, by randomly cutting or hydrolyzing the fiber cellulose predominantly at or near the surface of the fiber, degradation of the interior of the fiber cell wall is avoided or minimized. Consequently, a paper product made from these fibers alone, or made from blends of these fibers with untreated pulp fibers, show an increase in strength properties such as dry tensile, wet tensile, tear, etc.

Other examples of useful cellulose-based compositions useful in the present invention include those disclosed in U.S. Pat. Nos. 6,837,970, 6,824,650, 6,863,940 and in U.S. Patent Application Publication Nos. US20050192402 and 20040149412 each of which is incorporated herein by reference. Cellulosic webs prepared in accordance with the present invention can be used for a wide variety of applications, such as paper and paperboard products (i.e., other than paper towels), newsprint, uncoated groundwood, coated groundwood, coated free sheet, uncoated free sheet, packaging and industrial papers, linerboard, corrugating medium, recycled paperboard, and bleached paperboard. Webs made according to the present invention can be used in diapers, sanitary napkins, composite materials, molded paper products, paper cups, paper plates, and the like. Materials prepared according to the present invention can also be used in various textile applications, particularly in textile webs comprising a blend of cellulosic materials and wool, nylon, silk or other polyamide or protein-based fibers.

The paper products may contain a variety of fiber types both natural and synthetic. In one embodiment the paper products comprises hardwood and softwood fibers. The overall ratio of hardwood pulp fibers to softwood pulp fibers within the product, including individual sheets making up the product may vary broadly. The ratio of hardwood pulp fibers to softwood pulp fibers may range from about 9:1 to about 1:9, more specifically from about 9:1 to about 1:4, and most specifically from about 9:1 to about 1:1. In one embodiment of the present invention, the hardwood pulp fibers and softwood pulp fibers may be blended prior to forming the paper sheet thereby producing a homogenous distribution of hardwood pulp fibers and softwood pulp fibers in the z-direction of the sheet. In another embodiment of the present invention, the hardwood pulp fibers and softwood pulp fibers may be layered so as to give a heterogeneous distribution of hardwood pulp fibers and softwood pulp fibers in the z-direction of the sheet. In another embodiment, the hardwood pulp fibers may be located in at least one of the outer layers of the paper product and/or sheets wherein at least one of the inner layers may comprise softwood pulp fibers. In still another embodiment the paper product contains secondary or recycled fibers optionally containing virgin or synthetic fibers.

In addition, synthetic fibers may also be utilized in the present invention. The discussion herein regarding pulp fibers is understood to include synthetic fibers. Some suitable polymers that may be used to form the synthetic fibers include, but are not limited to: polyolefins, such as, polyethylene, polypropylene, polybutylene, and the like; polyesters, such as polyethylene terephthalate, poly(glycolic acid) (PGA), poly (lactic acid) (PLA), poly(β-malic acid) (PMLA), poly(ϵ-caprolactone) (PCL), poly(ρ-dioxanone) (PDS), poly(3-hydroxybutyrate) (PHB), and the like; and, polyamides, such as nylon and the like. Synthetic or natural cellulosic polymers, including but not limited to: cellulosic esters; cellulosic ethers; cellulosic nitrates; cellulosic acetates; cellulosic acetate butyrates; ethyl cellulose; regenerated celluloses, such as viscose, rayon, and the like; cotton; flax; hemp; and mixtures thereof may be used in the present invention. The synthetic fibers may be located in one or all of the layers and sheets comprising the paper product.

Cellulose-based articles can be formed by a variety of processes known to those skilled in the art. Machines may be configured to have a forming section, a press section, a drying section, and depending on the article formed, optionally a reel. Examples of the details of the process steps and schematic illustrations may be found in "Properties of Paper: An Introduction," 2nd edition, W. Scott and J. Abbott, TAPPI Press 1995. In a simplified description of the process, typically a dilute suspension of pulp fibers is supplied by a headbox and deposited via a sluice in a uniform dispersion onto a forming fabric of a conventional papermaking machine. The suspension of pulp fibers may be diluted to any consistency which is typically used in conventional papermaking processes. For example, the suspension may contain from about 0.01 to about 1.5 percent by weight pulp fibers suspended in water. Water is removed from the suspension of pulp fibers to form a uniform layer of pulp fibers. Other paper-making processes, paper-board manufacturing processes, and the like, may be utilized with the present invention. For example, the processes disclosed in U.S. Pat. No. 6,423,183 may be used.

The pulp fibers may be any high-average fiber length pulp, low-average fiber length pulp, or mixtures of the same. The high-average fiber length pulp typically have an average fiber length from about 1.5 mm to about 6 mm. An exemplary high-average fiber length wood pulp includes one available from the Neenah Paper Inc. under the trade designation LONGLAC 19.

The low-average fiber length pulp may be, for example, certain virgin hardwood pulps and secondary (i.e. recycled) fiber pulp from sources such as, for example, newsprint, reclaimed paperboard, and office waste. The low-average fiber length pulps typically have an average fiber length of less than about 1.2 mm, for example, from 0.7 mm to 1.2 mm.

Mixtures of high-average fiber length and low-average fiber length pulps may contain a significant proportion of low-average fiber length pulps. For example, mixtures may contain more than about 50 percent by weight low-average fiber length pulp and less than about 50 percent by weight high-average fiber length pulp. One exemplary mixture contains 75 percent by weight low-average fiber length pulp and about 25 percent high-average fiber length pulp.

The pulp fibers used in the present invention may be unrefined or may be beaten to various degrees of refinement. Small amounts of wet-strength resins and/or resin binders may be added to improve strength and abrasion resistance. Useful binders and wet-strength resins include, for example, KYMENE 557H available from the Hercules Chemical Company and PAREZ 631 available from American Cyanamid, Inc. Cross-linking agents and/or hydrating agents may also be added to the pulp mixture. Debonding agents may be added to the pulp mixture to reduce the degree of hydrogen bonding if a very open or loose nonwoven pulp fiber web is desired. One exemplary debonding agent is available from the Quaker Chemical Company, Conshohocken, Pa., under the trade designation QUAKER 2008. The addition of certain debonding agents in the amount of, for example, 1 to 4 percent, by weight, of the composite also appears to reduce the measured static and dynamic coefficients of function and improve the abrasion resistance of the continuous filament rich side of the composite fabric. The de-bonder is believed to act as a lubricant or friction reducer.

When treating paper webs in accordance with the present disclosure, the additive composition containing the blended polyolefin dispersion can be applied to the web topically or can be incorporated into the web by being pre-mixed with the fibers that are used to form the web. When applied topically, the additive composition can be applied to the web when the web is wet or dry. In one embodiment, the additive composition may be applied topically to the web during a creping process. For instance, in one embodiment, the additive composition may be sprayed onto the web or onto a heated dryer drum to adhere the web to the dryer drum. The web can then be creped from the dryer drum. When the additive composition is applied to the web and then adhered to the dryer drum, the composition may be uniformly applied over the surface area of the web or may be applied according to a particular pattern.

When topically applied to a paper web, the additive composition may be sprayed onto the web, extruded onto the web, or printed onto the web. When extruded onto the web, any suitable extrusion device may be used, such as a slot-coat extruder or a meltblown dye extruder. When printed onto the web, any suitable printing device may be used. For example, an inkjet printer or a rotogravure printing device may be used.

The blended polyolefin dispersions may be incorporated at any point in the paper manufacturing process. The point during the process at which the dispersion is incorporated into the cellulose-based composition may depend upon the desired end properties of the cellulose-based product, as will be detailed later. Incorporation points may include pre-treatment of pulp, co-application in the wet end of the process, post treatment after drying but on the paper machine and topical post treatment. Incorporation of the dispersion of the present invention onto or in the cellulose-based structure may be achieved by any of several methods, as incorporated by reference, and known by those of ordinary skill in the art.

In yet another application, a blended polyolefin dispersion formed in accordance with the disclosure, is suitable for impregnating a fibrous structure. In certain cases, a fibrous structure impregnated with such a stiffening composition can provide adequate stiffness, elasticity, resilience, adhesion, and shape retention for use in shoe stiffeners, such as toe boxes, counters, and the like. Suitable techniques for impregnation are disclosed in U.S. Patent Application No. 2007-0141933, which is expressly incorporated by reference in its entirety.

One skilled in the art will appreciate that a desirable degree or amount of impregnation can range from a partial saturation of the fibrous structure to a complete saturation of the fibrous structure. The desired degree of impregnation can depend upon variables including the nature of the fiber being impregnated and the nature of impregnate, for example. One skilled in the art will also appreciate that the intended end properties of the impregnated structure will influence the selection of the specific ingredients (fibers and dispersions, for example) and processing parameters.

In yet another application, blended polyolefin dispersions may be useful as toner material compositions that can be used to produce aggregated toner particles, wherein at least one selected from the group consisting of a colorant and a magnetic pigment is used with the dispersion, and wherein the dispersion has an average volume diameter particle size from about 0.3 to about 10 microns. Techniques for formulating such toner compositions are discussed in co-pending, co-assigned, U.S. Provisional Application Ser. No. 60/779,126 filed on Mar. 3, 2006, which is expressly incorporated by reference in its entirety.

Briefly, after forming the dispersion, dispersion particles may be aggregated into particles 1 to 10 microns in size, and at least a portion of the liquid may be removed to form toner particles. In selected embodiments, substantially all of the water may be removed to form base toner particles. In some embodiments, drying of the dispersion may be accomplished by spray drying or vacuum drying the dispersion. As is known in the art, spray drying involves the atomization of a liquid feedstock into a spray of droplets and contacting the droplets with hot air in a drying chamber. The sprays are typically produced by either rotary (wheel) or nozzle atomizers. Evaporation of moisture from the droplets and formation of dry particles proceed under controlled temperature and airflow conditions. Powder is discharged substantially continuously from the drying chamber. Operating conditions and dryer design are selected according to the drying characteristics of the product and powder specification.

Thus, in one embodiment, dispersions may be formed, and shipped to another location, where the dispersions are subjected to post-treatment processes such as particle aggregation and drying to form a toner powder.

In select embodiments, it is advantageous to add auxiliary fine particles to the base toner particles in order to improve the fluidity, the electrification stability, or the blocking resistance at a high temperature, etc. The auxiliary fine particles to be fixed on the surface of the base toner particles may be suitably selected for use among various inorganic or organic fine particles.

As the inorganic fine particles, various carbides such as silicon carbide, boron carbide, titanium carbide, zirconium carbide, hafnium carbide, vanadium carbide, tantalum carbide, niobium carbide, tungsten carbide, chromium carbide, molybdenum carbide and calcium carbide, various nitrides such as boron nitride, titanium nitride and zirconium nitride, various borides such as zirconium boride, various oxides such as titanium oxide, calcium oxide, magnesium oxide, zinc oxide, copper oxide, aluminum oxide, cerium oxide, silica and colloidal silica, various titanate compounds such as calcium titanate, magnesium titanate and strontium titanate, phosphate compounds such as calcium phosphate, sulfides such as molybdenum disulfide, fluorides such as magnesium fluoride and carbon fluoride, various metal soaps such as aluminum stearate, calcium stearate, zinc stearate and magnesium stearate, talc, bentonite, various carbon black and conductive carbon black, magnetite and ferrite, may, for example, be employed. As the organic fine particles, fine particles of a styrene resin, an acrylic resin, an epoxy resin or a melamine resin, may, for example, be employed.

Among such auxiliary fine particles, silica, titanium oxide, alumina, zinc oxide, various carbon black or conductive carbon black may, for example, be particularly preferably employed. Further, such auxiliary fine particles may include the above mentioned inorganic or organic fine particles, where the surface of the particles is treated by surface treatment such as hydrophobic treatment by a treating agent such as a silane coupling agent, a titanate coupling agent, a silicone oil, a modified silicone oil, a silicone varnish, a fluorinated silane coupling agent, a fluorinated silicone oil or a coupling agent having amino groups or quaternary ammonium bases. Such treating agents may be used in combination as a mixture of two or more of them.

As a method for adding the auxiliary fine particles to the base toner particles, a method is known to add and blend them by means of a high speed stirring machine such as a Henschel mixer. However, in order to improve the blocking resistance at a high temperature, it is preferred to have the auxiliary fine particles fixed on the surface of the base toner particles. In the present invention, fixing means an addition method employing an apparatus capable of exerting a compression sharing stress (hereinafter referred to as a compression shearing treatment apparatus) or an apparatus capable of melting or softening the surface of the base toner particles (hereinafter referred to as a particle surface-melting treatment apparatus). By such fixing treatment, the auxiliary fine particles may be firmly be fixed to the surface of the base toner particles without substantial pulverization of the base toner particles, whereby blocking resistance during the storage at a high temperature may be improved, and it is possible to produce a toner which is less likely to bring about fusion to components of a copying machine or a printer even in a continuous copying operation.

The above-mentioned compression shearing treatment apparatus is constructed to have a narrow clearance defined by a head surface and a head surface, a head surface and a wall surface, or a wall surface and a wall surface, which are mutually mobile while a distance is maintained, so that the particles to be treated are forcibly passed through the clearance, whereby a compression stress and a shearing stress will be exerted to the surface of the particles without substantially pulverizing them. As the compression shearing treatment apparatus to be used, a mechanofusion apparatus manufactured by Hosokawa Micron K.K., may, for example, be mentioned.

The above-mentioned particle surface-melting treatment apparatus is usually constructed so that a mixture of the base toner fine particles and the auxiliary fine particles is instantaneously heated to a temperature of at least the melting-initiation temperature by means of, for example, a hot air stream thereby to have the auxiliary fine particles fixed. As the particle surface-melting treatment apparatus to be used, a surfacing system manufactured by Nippon Neumatic K.K. may be employed.

Blended dispersions disclosed herein may be disposed on a substrate to adhere two or more layers. For example, blended dispersions disclosed herein may be used in the manufacture of carpeting, such as where the dispersion is used as an adhesive between carpet face fibers and a carpet backing, or as an adhesive between a primary carpet backing and a secondary carpet backing. In some embodiments, the blended dispersions may be applied to the substrate as froth. In other embodiments, the blended dispersions may be used as an adhesive layer in a multi-layered lamination used as a carpet backing. In yet other embodiments, blended dispersions described herein may be used in carpet seam sealing tapes.

In yet another application, blended polyolefin dispersions may be useful as films, adhesives, or other sealing and/or packaging applications. This particular application involves applying a dispersion formulated in accordance with the above disclosure to a substrate. Those having skill in the art will appreciate that any useful substrate may be used. In particular, a wide variety of polymer substrates may be used, and even more particularly, oriented polymers may be used. Such techniques are disclosed for example, in U.S. Patent Application Publication No. 20050271888, which is expressly incorporated by reference in its entirety.

Thus, embodiments of the present invention, provide heat sealable films that may allow for higher packaging line speeds (due to lower heat seal initiation temperatures), provide the ability to seal packages over broad operating windows, and provide good package integrity.

In other words, one or more embodiments of the present invention provide the ability to seal packages over a broad operating window. During startup and shutdown of packaging lines, the temperature of the sealing equipment can often deviate, sometimes by a large amount, from the set point. With a packaging film having a low heat seal initiation temperature, an adequate seal can still be generated if the sealing equipment is somewhat cooler than desired.

In order to determine the heat seal initiation temperature, for each coated weight, individual strips (1 inch wide) having no backing may be heat sealed from 50 to 140° C. in 10° C. increments, using a Packforsk Hot Tack Tester set at 40 psi seal pressure and 0.5 second dwell time. Sealed samples are allowed to equilibrate for at least a day in an ASTM room set at 70° F. (21.1° C.) and 50% relative humidity before being pulled on Instron model 4501 tensile testing device at a rate of 10 inches per minute. As used herein, the temperature at which a seal strength of 0.5 lb/in is achieved is defined as the heat seal initiation temperature.

In yet another application, blended polyolefin dispersions may be useful in forming long fiber-reinforced thermoplastic concentrates. Techniques for forming such concentrates are disclosed in co-pending, Ser. No. 60/697,324, which is incorporated by reference in its entirety.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:
1. A blended polyolefin dispersion comprising:
a blend dispersion formed from
(A) a first dispersion comprising (i) an ethylene/α-olefin multi-block copolymer having hard segments and soft segments and (ii) a surfactant, the dispersed ethylene/α-olefin multi-block copolymer having an average particle size ranging from 0.1 to 5 microns; and
(B) a second dispersion having a pKa greater than or equal to 10 and comprising an alpha-beta unsaturated carboxylic acid-based polymer, the dispersed alpha-beta unsaturated carboxylic acid-based polymer having an average particle size ranging from 0.02 microns to 1 micron, wherein the average particle size of (A) is larger than the average particle size of (B).

2. The blended polyolefin dispersion of claim 1, wherein the first or second dispersion further comprises at least one of water, a liquid hydrocarbon, and a water-compatible organic compound.

3. The blended polyolefin dispersion of claim 1, wherein the average particle size of (A) is at least twice the average particle size of (B) by at least 50%.

4. The blended polyolefin dispersion of claim 1, wherein the particles size of (A) is at least ten times larger than the particle size of (B).

5. The blended polyolefin dispersion of claim 1, wherein the number average molecular weight of (A) is larger than the number average molecular weight of (B), as measured by gel permeation chromatography.

6. The blended polyolefin dispersion of claim 1, wherein the number average molecular weight of (A) is at least twice the number average molecular weight of (B), as measured by gel permeation chromatography.

7. The blended polyolefin dispersion of claim 1, wherein the alpha-beta unsaturated carboxylic acid-based polymer comprises at least one of an ethylene-acrylic acid copolymer and an ethylene-methacrylic acid copolymer.

8. The blended polyolefin dispersion of claim 1, wherein the alpha-beta unsaturated carboxylic acid-based polymer is at least partially neutralized.

9. A froth produced from the dispersion of claim 1.

10. A foam produced from the dispersion of claim 1.

11. The blended polyolefin dispersion of claim 1 comprising from 80 wt % to 95 wt % of the first dispersion (A) and from 20 wt % to 5 wt % of the second dispersion (B).

12. The blended polyolefin dispersion of claim 1, wherein the blend dispersion has a pH greater than 7.0.

13. The blended polyolefin dispersion of claim 1, wherein the blend dispersion has a pH greater than 9.0.

14. The blended polyolefin dispersion of claim 1, wherein the dispersed ethylene/α-olefin multi-block copolymer has an average particle size from 0.5 microns to 2.7 microns and the dispersed alpha-beta unsaturated carboxylic acid-based polymer has an average particle size from 0.06 to 1.0 microns.

* * * * *